(12) United States Patent
Biddix et al.

(10) Patent No.: US 12,012,358 B2
(45) Date of Patent: Jun. 18, 2024

(54) METHOD OF APPLYING COATING LIQUID TO AN OPTICAL FIBER

(71) Applicant: CORNING INCORPORATED, Corning, NY (US)

(72) Inventors: Derrick Baxter Biddix, Wilmington, NC (US); Kenneth James Kelmer, Wilmington, NC (US); Robert Clark Moore, Wilmington, NC (US); Douglas Gregg Neilson, Wilmington, NC (US); Donald Justin Sonnett, Wilmington, NC (US); Jennifer Nicole Subler, Wilmington, NC (US); David Andrew Tucker, Wilmington, NC (US); John Edward Watson, Hampstead, NC (US)

(73) Assignee: Corning Incorporated, Corning, NY (US)

( * ) Notice: Subject to any disclaimer, the term of this patent is extended or adjusted under 35 U.S.C. 154(b) by 299 days.

(21) Appl. No.: 17/331,979

(22) Filed: May 27, 2021

(65) Prior Publication Data
US 2021/0395143 A1 Dec. 23, 2021

Related U.S. Application Data

(60) Provisional application No. 63/041,473, filed on Jun. 19, 2020.

(30) Foreign Application Priority Data

Jul. 3, 2020 (NL) ...................................... 2025983

(51) Int. Cl.
*C03C 25/18* (2006.01)
*C03B 37/02* (2006.01)
*C03C 25/26* (2018.01)

(52) U.S. Cl.
CPC .............. *C03C 25/18* (2013.01); *C03B 37/02* (2013.01); *C03C 25/26* (2013.01)

(58) Field of Classification Search
None
See application file for complete search history.

(56) References Cited

U.S. PATENT DOCUMENTS

| 5,217,533 A | 6/1993 | Hay et al. |
| 7,591,904 B2 | 9/2009 | Bertz et al. |

(Continued)

FOREIGN PATENT DOCUMENTS

| CN | 202519160 U | 11/2012 |
| CN | 202576251 U | 12/2012 |

(Continued)

OTHER PUBLICATIONS

Jacqmin, "Very, very fast wetting", In Journal of Fluid Mechanics, vol. 455, Mar. 2002, pp. 347-358.

(Continued)

*Primary Examiner* — Michael G Miller
(74) *Attorney, Agent, or Firm* — Kevin L. Bray

(57) ABSTRACT

Provided herein is a method of and system for processing an optical fiber. The method includes the steps of drawing an optical fiber in a drawing direction along a process pathway through a coating chamber comprising an inlet and an outlet, and a coating liquid volume to coat the optical fiber; supplying the coating liquid through the inlet, the coating liquid exiting the coating chamber through the outlet; and recirculating to coating liquid exiting the coating chamber to the inlet.

19 Claims, 15 Drawing Sheets

(56) References Cited

U.S. PATENT DOCUMENTS

2005/0028731 A1    2/2005    Lindholm
2015/0147467 A1    5/2015    Moore et al.
2018/0304304 A1*    10/2018    Moore ..................... B05D 3/06

FOREIGN PATENT DOCUMENTS

| CN | 203256147 U | 10/2013 |
| --- | --- | --- |
| CN | 204039256 U | 12/2014 |
| CN | 205002818 U | 1/2016 |
| CN | 105859121 A | 8/2016 |
| CN | 207025751 U | 2/2018 |
| EP | 2969255 A2 | 1/2016 |
| JP | 2000-001341 A | 1/2000 |
| JP | 2010-197455 A | 9/2010 |
| WO | 2009/015695 A1 | 2/2009 |
| WO | 2012/090427 A1 | 7/2012 |
| WO | 2014/152896 A2 | 9/2014 |
| WO | 2015/080881 A1 | 6/2015 |
| WO | 2018/200229 A1 | 11/2018 |

OTHER PUBLICATIONS

Netherlands Search Report and Written Opinion of the Searching Authority; 2025983; dated Feb. 22, 2021; 12 pages (Original Document Only); Netherlands Patent Office.

* cited by examiner

METHOD OF APPLYING COATING LIQUID TO AN OPTICAL FIBER

This application claims the benefit of priority to Dutch Patent Application No. 2025983 filed on Jul. 3, 2020, which claims priority from U.S. Provisional Patent Application Ser. No. 63/041,473 filed on Jun. 19, 2020, the content of which is relied upon and incorporated herein by reference in its entirety.

FIELD

The disclosure relates to a method for coating an optical fiber. More particularly, the disclosure relates to a method for applying a coating liquid to an optical fiber.

BACKGROUND

In a typical optical fiber draw process, fiber is continuously drawn from a glass preform at a particular draw speed. The glass preform includes a central region having the core composition desired for the drawn fiber and one or more surrounding annular regions having the composition desired for one or more cladding regions of the drawn optical fiber. The preform is positioned in a draw furnace and heated sufficiently to soften the glass. The action of gravity and a pulling force driven by a capstan leads to extension of glass from the softened portion of the preform. As the glass extends, it thins and forms a fiber. The diameter of the fiber is controlled, the fiber is cooled, and is then directed to a coating unit for application of one or more coating liquids. The coating liquids are cured to form solid coatings and the coated fiber is taken up and wound on a spool. The route traversed by the fiber as it progresses from the draw furnace to the spool is referred to as the process pathway.

There is a continuing need to reduce the cost of optical fiber manufacturing by increasing the draw speed. As draw speed increases, however, it becomes more difficult to apply and cure the coating liquid. In particular, it becomes more difficult to achieve coatings with uniform thickness over the length and circumference of the fiber. Uniformity of coating thickness is needed to facilitate splicing and joining of coated fibers, and to attach connectors to the ends of coated fibers. There is currently a need for coating processes that permit formation of coatings of uniform thickness on glass fibers in continuous high speed draw processes.

SUMMARY

The methods and systems described herein address the aforementioned problems by enabling high draw speed processes for manufacturing optical fibers. Draw speed is currently limited by two problems: (1) difficulties in wetting the optical fiber with the coating liquid as it exits a guide die and enters a coating chamber; and (2) increased severity of effects associated with gyres formed in the coating chamber in the vicinity of the sizing die as the optical fiber exits the coating chamber. The present methods and systems address both problems and allows for increased draw speed while minimizing coating defects. Draw speeds available from the current method are at least 30 m/s, or at least 40 m/s, or at least 50 m/s, or at least 60 m/s, or at least 70 m/s, or in the range from 30 m/s-90 m/s, or in the range from 40 m/s-80 m/s.

Examples are provided herein of a method of processing an optical fiber, comprising the steps of: drawing an optical fiber in a drawing direction along a process pathway through a coating chamber, the coating chamber comprising: an inlet and an outlet, and a coating liquid to coat the optical fiber; pumping the coating liquid through the inlet into the coating chamber, the coating liquid exiting the coating chamber through the outlet; and recirculating the coating liquid exiting the coating chamber to the inlet.

Aspect 1 of the description is:
A method of processing an optical fiber, comprising the steps of:
drawing an optical fiber in a drawing direction along a process pathway through a coating chamber, the coating chamber comprising:
an inlet and an outlet, and
a coating liquid to coat the optical fiber;
supplying the coating liquid through the inlet into the coating chamber, the coating liquid exiting the coating chamber through the outlet; and
recirculating the coating liquid exiting the coating chamber to the inlet.

Aspect 2 of the description is:
The method of Aspect 1, wherein the supplying comprises varying the coating liquid between a maximum pressure and a minimum pressure, the minimum pressure being greater than a pressure of the coating liquid in the coating chamber.

Aspect 3 of the description is:
The method of Aspect 1 or 2, wherein a flow rate of the coating liquid through the coating chamber from the inlet to the outlet is approximately constant.

Aspect 4 of the description is:
The method of Aspect 3, wherein the pressure and the flow rate of the coating liquid in the coating chamber are each independently controlled.

Aspect 5 of the description is:
The method of any of Aspects 1-4, wherein a temperature of the coating liquid at the inlet is less than a temperature of the coating liquid at the outlet.

Aspect 6 of the description is:
The method of any of Aspects 1-5, wherein the inlet and the outlet are fluidly coupled to at least one of at least one filter, at least one pressure control valve, at least one flow meter, at least one flow control valve, at least one check valve, and at least one bubble trap.

Aspect 7 of the description is:
The method of any of Aspects 1-5, wherein the inlet and the outlet are fluidly coupled to at least one filter, at least one pressure control valve, at least one flow meter, at least one flow control valve, at least one check valve, and at least one bubble trap.

Aspect 8 of the description is:
The method of any of Aspects 1-7, wherein a pressure of the coating liquid in the coating chamber is at least 0.10 psig.

Aspect 9 of the description is:
The method of any of Aspects 1-8, wherein the optical fiber enters the coating chamber through a guide die.

Aspect 10 of the description is:
The method of Aspect 9, wherein the guide die comprises a bell section, a taper section, and a land section, or wherein the guide die comprises a cone-only guide die, the cone-only guide die comprising a cone section and a land section, the cone-only guide die lacking a bell section.

Aspect 11 of the description is:
The method of Aspect 9 or 10, wherein the optical fiber is drawn through the coating chamber to a sizing die.

Aspect 12 of the description is:

The method of Aspect 11, wherein the coating liquid is directed in a transverse direction through a channel positioned in the coating chamber between the guide die and the sizing die.

Aspect 13 of the description is:

The method of Aspect 12, wherein the channel is oriented in a direction approximately perpendicular to the drawing direction.

Aspect 14 of the description is:

The method of any of Aspects 11-13, wherein the sizing die comprises a cone-only sizing die, the cone-only sizing die comprising a cone section and a land section, the cone-only sizing die lacking a bell section.

Aspect 15 of the description is:

The method of any of Aspects 11-14, wherein the outlet is spaced apart from the guide die and the sizing die.

Aspect 16 of the description is:

The method of any of Aspects 11-15, further comprising curing the coating liquid after the optical fiber exits the sizing die.

Aspect 17 of the description is:

The method of any of Aspects 1-16, wherein an approximately equal amount of the coating liquid exits through the outlet as enters through the inlet.

Aspect 18 of the description is:

The method of any of Aspects 1-17, wherein the coating liquid is supplied through the inlet into the coating chamber at flow rate greater than 0.1 cm$^3$/s.

Aspect 19 of the description is:

The method of any of Aspects 1-18, wherein the optical fiber is drawn in the drawing direction at a draw speed of at least 40 m/s.

Aspect 20 of the description is:

The method of any of Aspects 1-19, wherein the coating liquid comprises one or more compounds selected from the group consisting of: a radiation-curable compound, an ethylenically unsaturated compound, and an acrylate or methacrylate compound.

Aspect 21 of the description is:

The method of any of Aspects 1-20, wherein the coating liquid supplied through the inlet is directed against a gyre comprising the coating liquid contained in the coating chamber, the gyre being formed in the coating chamber adjacent to the optical fiber.

Aspect 22 of the description is:

The method of Aspect 21, wherein a difference between a maximum temperature of the coating liquid in the gyre and a minimum temperature of the coating liquid in the gyre is less than 80° C.

Aspect 23 of the description is:

The method of Aspect 21 or 22, wherein the coating liquid supplied through the inlet is at a temperature at least 5° C. less than an average temperature of the coating liquid in the gyre.

Aspect 24 of the description is:

An optical fiber produced by the method of any of Aspects 1-23.

Aspect 25 of the description is:

A system for coating an optical fiber, comprising:
a coating chamber, the coating chamber comprising:
an inlet through which a coating liquid enters the coating chamber;
an outlet through which the coating liquid exits the coating chamber;
a fiber entrance; and
a fiber exit;
an apparatus configured to supply the coating liquid through the inlet into the coating chamber, the coating liquid exiting the coating chamber through the outlet, the apparatus comprising a recirculation loop configured to return the coating liquid exiting the outlet to the inlet.

Aspect 26 of the description is:

The system of Aspect 25, wherein the inlet comprises a cross-sectional dimension that is greater than 30% of the distance between the fiber entrance and the fiber exit.

Aspect 27 of the description is:

The system of Aspect 25 or 26, wherein the fiber entrance comprises a guide die and the fiber exit comprises a sizing die.

Aspect 28 of the description is:

The method of Aspect 27, wherein the sizing die has a cone-only design.

Aspect 29 of the description is:

The system of any of Aspects 25-28, wherein the apparatus comprises a diaphragm pump.

Aspect 30 of the description is:

The system of any of Aspects 25-29, wherein the coating chamber is pressurized to a first pressure, the first pressure greater than 0 psig.

Aspect 31 of the description is:

The system of Aspect 30, wherein the first pressure is at least 5.0 psig.

Aspect 32 of the description is:

The system of Aspect 30 or 31, wherein the apparatus comprises a pump that operates between a minimum pressure and a maximum pressure, the minimum pressure exceeding the first pressure.

Aspect 33 of the description is:

The system of any of Aspects 25-32, wherein the apparatus comprises a pressurized keg between and fluidly coupled to the pump and the inlet, the pressurized keg containing the coating liquid and maintaining the coating liquid at a first pressure.

Aspect 34 of the description is:

The system of Aspect 33, wherein the apparatus comprises a pressurized catch can between and fluidly coupled to the pump and the outlet, the pressurized catch can containing the coating liquid and maintaining the coating liquid at a second pressure less than the first pressure.

Aspect 35 of the description is:

The system of any of Aspects 25-34, wherein the apparatus comprises a bubble trap fluidly coupled to the outlet.

Aspect 36 of the description is:

The system of Aspect 35, wherein the bubble trap is positioned between the outlet and a pump.

Aspect 37 of the description is:

The system of any of Aspects 25-36, wherein the apparatus comprises a pressure regulator between and fluidly coupled to a pump and the inlet.

Aspect 38 of the description is:

The system of any of Aspects 25-37, wherein the apparatus comprises a pressure control loop for controlling a pressure of the coating liquid in the coating chamber and a flow control loop for controlling a flowrate of the coating liquid through the inlet, the pressure control loop comprising a pressure transducer and the flow control loop comprising a flowmeter.

BRIEF DESCRIPTION OF THE DRAWINGS

These and other features, aspects, and advantages of the present technology will become better understood with regard to the following drawings.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION

This disclosure is not limited to the specific compositions, articles, devices, and methods described herein unless otherwise specified. It is also to be understood that the terminology used herein is for the purpose of describing particular aspects only and is not intended to be limiting.

The disclosure refers to methods and processes for forming optical fibers. In a continuous optical fiber manufacturing process, an optical fiber is drawn from a heated preform positioned in a draw furnace and passed through a series of processing stages. Processing stages typically include metrology units (e.g. fiber diameter control) to assess quality and other characteristics of the optical fiber, heating stages, cooling stages, a primary coating stage, a secondary coating stage, an ink layer stage, one or more curing stages to cure coating liquids or ink layer liquids applied to the fiber, and a spool or other winding stage to receive and store the coated optical fiber. The pathway traversed by the optical fiber as it passes from the draw furnace through one or more process units to the winding stage is referred to herein as the process pathway of the optical fiber. The process pathway may be linear or may include turns.

Figure 1:
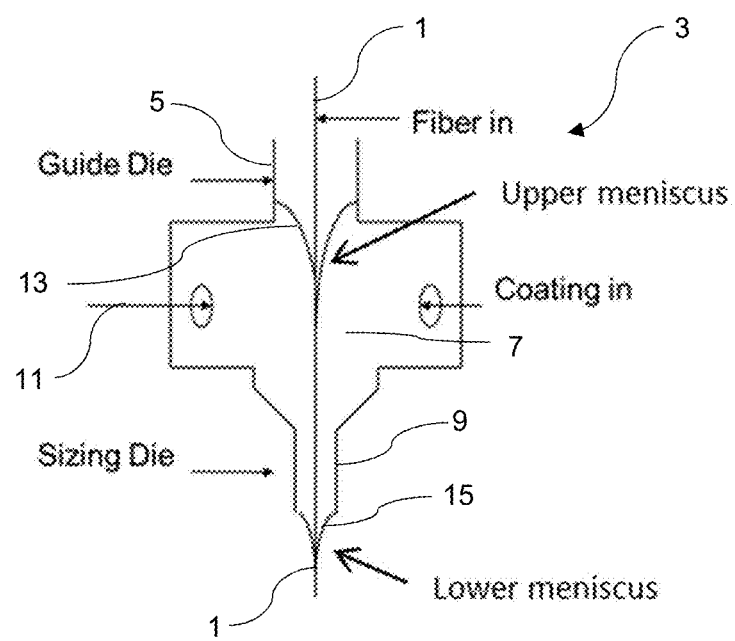
FIG. 1 is a schematic of a coating application unit according to the disclosure.

The relative position of one process unit relative to another process unit along the process pathway is described herein as upstream or downstream. The upstream direction of the process pathway is the direction toward the preform and the downstream direction of the process pathway is the direction toward the winding stage. Positions or processing units upstream from a reference position or processing unit are closer, along the process pathway, to the preform than the reference position or processing unit. A process unit located at a position closer to the draw furnace along the process pathway is said to be upstream of a process unit located at a position further away from the draw furnace along the process pathway. The draw furnace is upstream from all other process units and the take-up spool (or winding stage or other terminal unit) is downstream of all other process units. By way of example, the process pathway of an optical fiber in an illustrative draw process extends from a draw furnace to a cooling unit, from the cooling unit to a coating application unit, from the coating application unit to a coating curing unit, and from the coating curing unit to a take-up spool. In the context of the terminology used herein, the draw furnace is upstream of the cooling unit, which is upstream of the coating application unit, which is upstream from the coating curing unit, which is upstream of the take-up spool. Similarly, the take-up spool is downstream of the coating curing unit, which is downstream of the coating application unit, which is downstream of the cooling unit, which is downstream of the draw furnace The disclosure provides a method for applying a coating liquid to an optical fiber. The method is used to apply a coating liquid to a glass fiber, a coating liquid to another coating liquid, or a coating liquid to a cured coating. Making reference to FIG. 1, the method includes directing an optical fiber 1 along a process pathway that includes passing an optical fiber 1 through a coating application unit 3. The coating application unit 3 includes a guide die 5, a coating chamber 7 and a sizing die 9. The coating chamber 7 is pressurized and contains a coating liquid 11 that is used to coat the optical fiber 1. The coating liquid can be heated or not heated. When the coating liquid is heated, it is heated by a separate heating unit (not shown). The guide die 5 is upstream of the coating chamber 7, which is upstream of the sizing die 9. The optical fiber 1 passes through the guide die 5 into the coating chamber 7, through the coating chamber 7 to the sizing die 9, and through the sizing die 9 to downstream units in a fiber draw process.

As the fiber exits the guide die 5 and enters the coating chamber 7, it contacts the coating liquid 11. As the fiber wets, an upper meniscus 13 of coating liquid forms on the fiber adjacent the exit of the guide die 5 and a lower meniscus 15 forms on the fiber adjacent the exit of the sizing die 9. Coating liquid 11 is entrained by the fiber as it progresses along the process pathway to the sizing die 9. The fiber exits the sizing die with a layer of coating liquid adhered to it and is directed along the process pathway to a downstream processing unit (e.g. another coating unit or a curing unit). The thickness of coating liquid applied to the fiber is determined by the geometry of the sizing die, the viscosity of the coating liquid, the temperature of the fiber, and the draw speed. The diameter of the exit of the sizing die can be important in establishing the thickness of coating liquid applied to the fiber.

Successful coating and uniformity of coating thickness requires effective wetting of the fiber by the coating liquid as the fiber enters the coating chamber. The ambient of the fiber as it passes through the guide die is a gas (e.g. air, $CO_2$, He). By virtue of the motion of the fiber through the gas ambient, a gas boundary layer forms on the surface of the fiber as it passes through the guide die. The gas boundary layer remains with the fiber as it exits the guide die and enters the coating chamber.

Wetting refers to the process of displacing the gas boundary layer with the coating liquid as the fiber contacts and passes through the coating liquid in the coating chamber. When the fiber is properly wetted with the coating liquid, a meniscus of coating liquid forms at the interface of the surface of the fiber and the coating liquid in the vicinity of the exit of the guide die and a boundary layer of coating liquid forms on the fiber from the tip of the meniscus as the optical fiber is conveyed through the coating chamber toward the exit of the sizing die.

If the coating liquid fails to wet the fiber, a gas boundary layer remains on the fiber. This leads to entrainment of gas into the coating chamber and incorporation of gas in the coating liquid. The presence of gas in the coating liquid leads to the formation of bubbles in the coating liquid and to inclusion of the bubbles in the coating liquid applied to the fiber. The bubbles can destabilize the meniscus and lead to non-uniformities in the coverage of coating liquid on the surface of the fiber. The bubbles entrapped in coating liquid adhered to the fiber remain in the coating when the coating liquid is cured downstream of the sizing die. Bubbles in the cured coating constitute defects that compromise the performance of the fiber and facilitate delamination of the cured coating. The presence of bubbles in the coating chamber also makes it difficult to center and stabilize the position of the fiber as it passes through the coating application unit, an effect that further contributes to non-uniformity in coating thickness.

As draw speed increases, the force needed to displace the gas boundary layer to wet the fiber increases. In the present method, force sufficient to displace the gas boundary layer to enable wetting of the fiber at high draw speeds is achieved with a pressurized coating chamber. By increasing the pressure of the coating liquid in the coating chamber, greater force is available for applying the coating liquid to the fiber and consistent wetting of the fiber is maintained at the draw speeds disclosed herein. Pressurization of the coating chamber can be accomplished by equipping the coating chamber with a pressure transducer and using the pressure transducer to control the pressure of the coating chamber. In one embodiment, the stream of coating liquid delivered to the coating chamber is supplied from a pressurized source. By increasing the pressure of the coating chamber, the pressure of coating liquid in the coating chamber is increased and it becomes possible to overcome the pressure associated with the gas phase boundary layer to achieve wetting as draw speed is increased.

As used herein, pressurized coating chamber refers to a coating chamber 7 having a pressure greater than 0 psig. For example, the pressure of the pressurized coating chamber can be at least 0.10 psig, or at least 0.50 psig, or at least 1.0 psig, or at least 5.0 psig, or at least 10 psig, or at least 25 psig, or at least 50 psig, or at least 100 psig, or at least 200 psig, or in the range from 0.10 psig-300 psig, or in the range from 0.25 psig-275 psig, or in the range from 0.50 psig-250 psig, or in the range from 1.0 psig-225 psig, or in the range from 5.0 psig-200 psig, or in the range from 10 psig-175 psig, or in the range from 25 psig-150 psig or in the range from 50 psig-100 psig, where psig refers to gauge pressure in units of psi (pounds per square inch).

The higher pressure of coating liquid in the pressurized coating chamber leads to a higher meniscus pressure. Higher draw speeds are accordingly achieved by stabilizing a meniscus of coating liquid having a high pressure. The pressure of the meniscus of the coating liquid provided by the present method is greater than 0 psig, or at least 0.10 psig, or at least 0.50 psig, or at least 1.0 psig, or at least 5.0 psig, or at least 10 psig, or at least 25 psig, or at least 50 psig, or at least 100 psig, or at least 200 psig, or in the range from 0.1 psig-500 psig, or in the range from 1.0 psig-400 psig, or in the range from 5.0 psig-300 psig, or in the range from 10 psig-200 psig.

Figure 2:
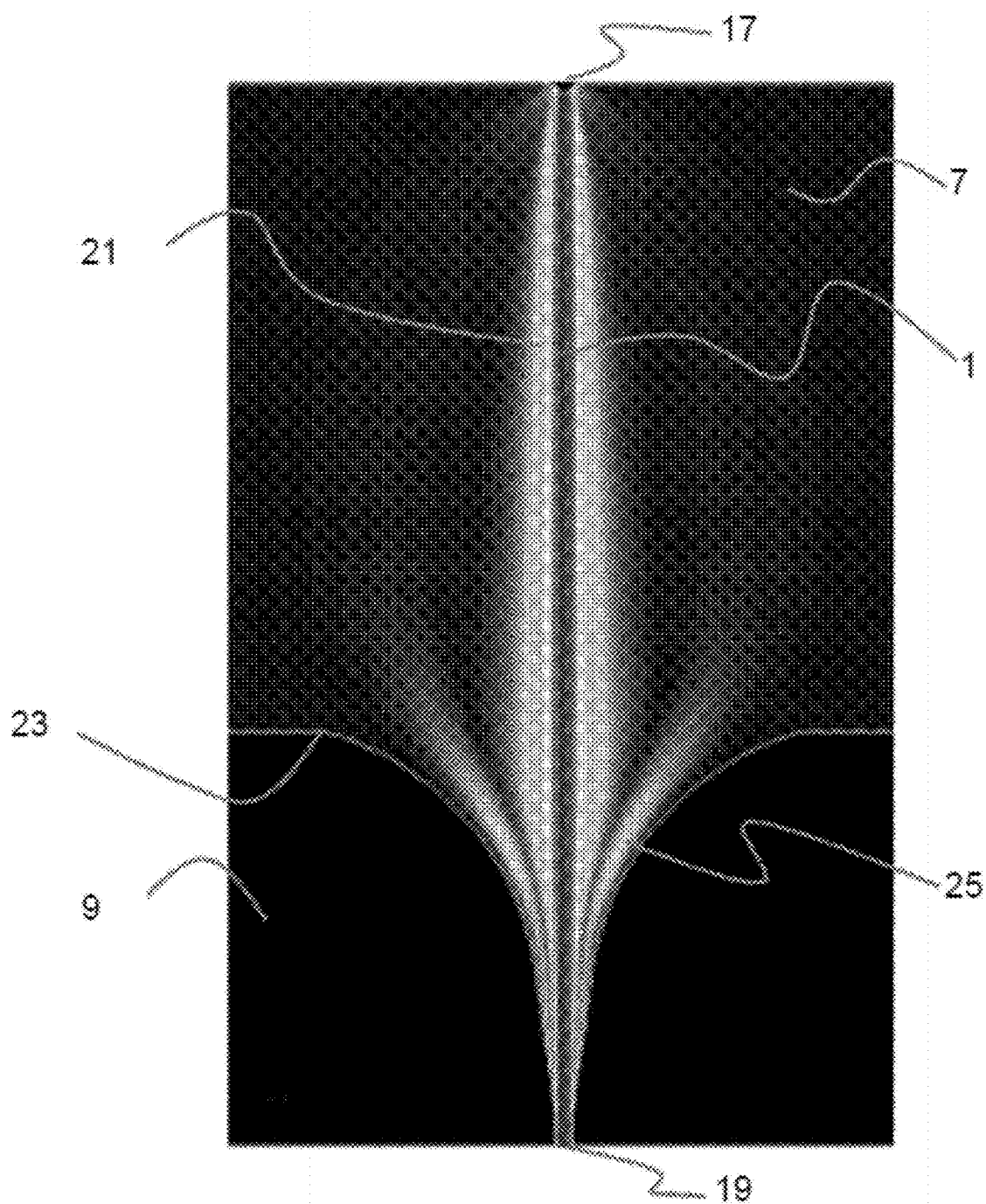
FIG. 2 is a calculated boundary layer of coating liquid on an optical fiber.

Measures taken to increase meniscus pressure can be complicated by effects that occur in the vicinity of the sizing die as the optical fiber exits the coating chamber. As noted above, as a wetted fiber moves from the guide die to the sizing die, a meniscus of coating liquid forms on the fiber and a boundary layer of coating liquid develops at the tip of the meniscus. The boundary layer extends with the fiber as it passes through the coating liquid. FIG. 2 shows a calculated (finite element) boundary layer of a coating liquid on an optical fiber as it passes through a coating chamber. Optical fiber 1 enters coating chamber 7 through guide die exit 17, passes through coating chamber 7 to sizing die 9 and exits through sizing die exit 19. Coating chamber 7 contains a coating liquid and optical fiber 1 is wetted with the coating liquid as it enters coating chamber 7 through guide die exit 17. For purposes of the calculation, wetting of optical fiber 1 includes complete displacement of the gas boundary layer associated with optical fiber 1 in the guide die by the coating liquid and occurs without formation of bubbles in coating chamber 7.

As optical fiber 1 passes through coating chamber 7, a boundary layer 21 of coating liquid forms. The thickness of boundary layer 21 increases as optical fiber 1 progresses toward sizing die 9. To a first order approximation, the thickness of the boundary layer is proportional to $(vX/V_f)$, where v is the kinematic viscosity of the coating liquid, X is the distance along the fiber pathway of a position in the boundary layer relative to the point of initiation of the boundary layer at the meniscus tip in the vicinity of the guide die exit, and $V_f$ is the draw speed of the fiber.

Sizing die 9 includes tapered surface 23 that constricts the space available for coating liquid. As constriction occurs, a portion 25 of the coating fluid from boundary layer 21 is expelled from sizing die 9 back into coating chamber 7. The expelled coating fluid forms gyres in coating chamber 7 adjacent to sizing die 9. A gyre is a loop-like localized flow pattern of coating liquid with nearly closed streamlines. As coating liquid recirculates within the gyre during the draw process, shear stresses associated with the flow lead to an increase in the temperature of the coating liquid in the gyre.

The shape of the gyre and distribution of temperatures within the gyre depends on the design of the sizing die. The size and severity of gyres, for example, depend on the degree of constriction in the space available to the coating liquid.

For thinner fiber coatings, narrower sizing dies are required and greater constriction occurs. Greater constriction leads to expulsion of a larger amount of coating liquid from the boundary layer as the fiber enters the tapered section of the sizing die and to more pronounced gyre formation.

Figure 3:
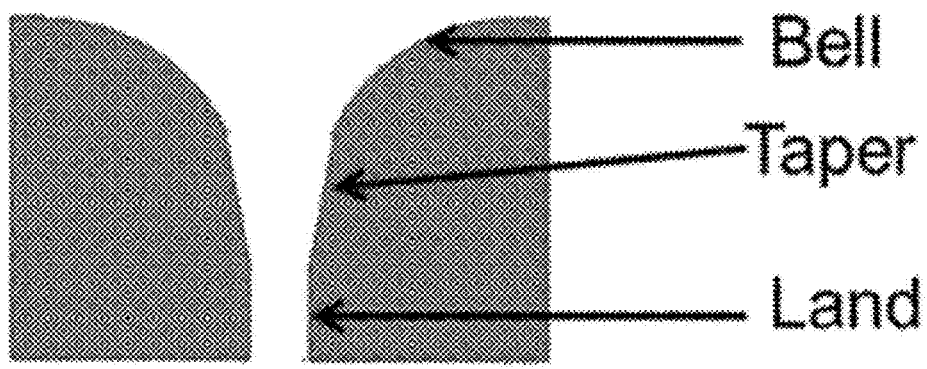
FIG. 3 is a schematic of a conventional design of a sizing die.
Figure 4:
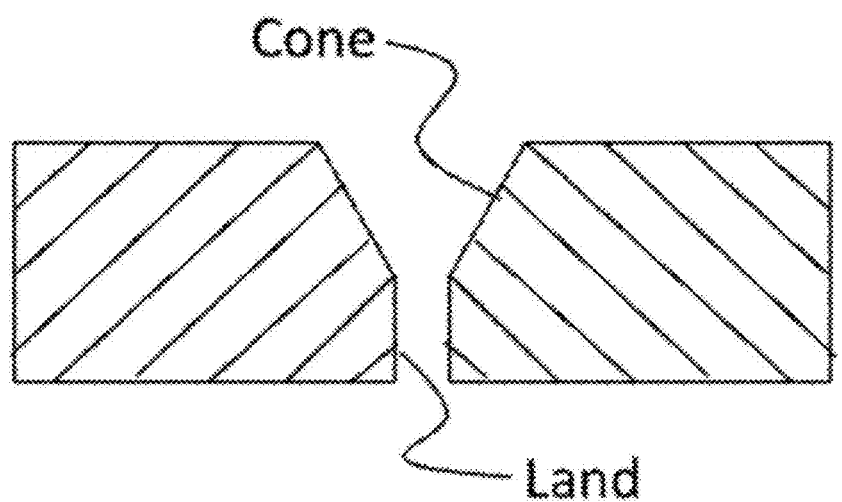
FIG. 4 is a diagram of a cone-only design of a sizing die.

The shape of the sizing die can also influence the position, shape and temperature distribution of a gyre. FIG. 3 illustrates a conventional design for a sizing die. The conventional design includes a bell section, a taper section, and a land section. FIG. 4 illustrates a cone-only design for a sizing die. The cone-only design lacks a bell section and includes a cone section and a land section. Further information on the cone-only design can be found in U.S. Published Patent Application No. 20150147467A1, the disclosure of which is incorporated by reference herein. Similar designs can also be used for the guide die. Typical dimensions for the guide die and sizing die are a distance (e.g. cross-sectional dimension such as diameter) less than 20 mm, or less than 15 mm, or less than 10 mm at the widest point of the taper; a distance (e.g. cross-sectional dimension such as diameter) less than 20 mm, or less than 15 mm, or less than 10 mm at the narrowest point of the taper (e.g. openings through which the optical fiber exits the die), and a height less than 20 mm, or less than 15 mm or less than 10 mm.

Figure 5:
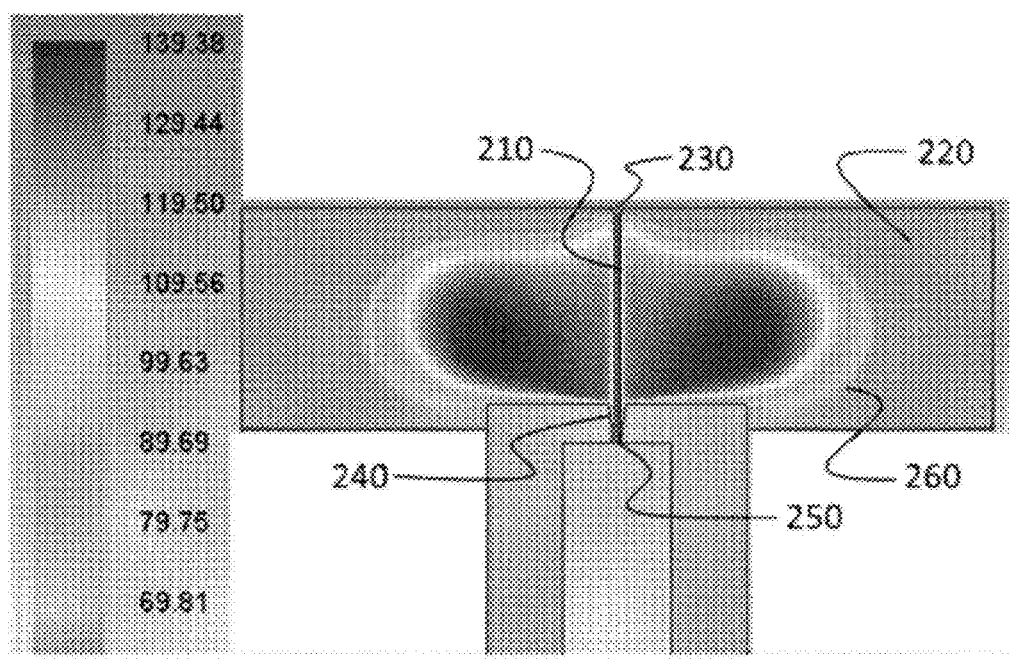
FIG. 5 is a calculated temperature profile of a gyre formed by a sizing die having a cone-only design.

FIG. 5 shows the calculated shape and temperature profile of a gyre formed adjacent to a sizing die having the cone-only design shown in FIG. 4. Optical fiber 210 enters a coating chamber section 220 through guide die exit 230 and passes through exit 250 of cone-only sizing die 240. A gyre having outer boundary 260 forms around optical fiber 210. Shading within the gyre indicates the temperature profile that develops in the gyre at steady state. The temperature scale shown at left indicates temperatures in units of ° C. Darker shading corresponds to higher temperature for coating liquid present in the gyre. The temperature of coating liquid is generally higher near optical fiber 210 and decreases away from optical fiber 210 until equalization with the temperature of the surrounding coating liquid occurs at outer boundary 260 of the gyre. For purposes of the calculation, the temperature of the coating liquid surrounding the gyre was set at 60° C. FIG. 5 indicates that the gyre formed by a cone-only die is elongated in a direction transverse to the process pathway of the fiber. Relative to the conventional die (FIG. 3), the gyre formed by a cone-only die (FIG. 4) is less tightly confined to spaces close to the fiber. The gyre extends for significant distances in lateral directions away from the process pathway. FIG. 5 also indicates that the highest temperatures in the gyre are approximately 80° C. warmer than the temperature of the coating fluid away from the gyre. The extent of heating of coating liquid in the gyre is less for the cone-only sizing die (FIG. 4) than for the conventional sizing die (FIG. 3).

The heating of coating liquid that occurs in the gyre is detrimental to the stability of the meniscus and leads to flooding of the guide die. Flooding is a process failure in which coating liquid is forced upstream through the guide die exit into the guide die by the pressure of the coating liquid in the coating chamber. Flooding typically leads to breakage of the fiber, which necessitates process shut down. Flooding becomes more likely due to the presence of gyres because as the coating liquid heats in a gyre, its viscosity decreases. The extent of heating and decrease in viscosity become more pronounced as the draw speed increases because higher draw speeds increase the circulatory flow rate within the gyre, which leads to greater shear effects and more heating due to viscous dissipation. For draw speeds typical of current manufacturing processes, the temperature increase associated with gyres (about 70° C. and higher) is sufficient to reduce the viscosity of the coating liquid by an order of magnitude or more. As draw speed increases above current values, heating and thermal effects associated with gyres become more pronounced.

While not wishing to be bound by any specific theory, it is believed that heating and a reduction in the viscosity of the coating liquid increase the likelihood of flooding because they (1) make the coating liquid more buoyant than the surrounding coating liquid and (2) reduce the pressure needed to induce back flow of the coating liquid into the guide die. As a result, if warmer, less viscous coating liquid escapes from the gyre and enters the surrounding coating liquid, it tends to flow upward in the coating chamber to the guide die. If the warmer, less viscous coating liquid reaches the meniscus, it destabilizes the meniscus and leads to dewetting of the fiber. As the fiber dewets, the drag force associated with the liquid boundary layer needed to resist back flow of coating liquid into the guide die is lost and the pressure needed to force the coating liquid up through the guide die exit into the guide die is reduced. Flooding accordingly ensues.

While not wishing to be bound by any specific theory, it is believed that bubbles in the coating liquid can also promote flooding. The presence of bubbles can lead to random, chaotic motion of coating liquid within and around the gyre. The random, chaotic motion facilitates escape of warmer, viscous coating liquid from the gyre and promotes migration of warmer, viscous coating liquid toward the meniscus.

To maintain a stable meniscus and uninterrupted, continuous wetting of the fiber, it is beneficial to limit the effects of gyres on the coating process. The present method mitigates deleterious effects of gyres by supplying a flow of coating liquid to the space between the exit of the guide die and the entrance to the sizing die. The flow can be a transverse flow. Transverse flow refers to flow of coating liquid in a direction transverse to the process pathway of the fiber as it passes through the coating chamber. Transverse direction refers to any direction that is not parallel to the process pathway of the fiber. In one embodiment, the transverse flow is a flow perpendicular to the process pathway. The transverse flow of coating liquid mixes or interacts with coating liquid in the gyre. For example, a transverse flow of coating liquid enters a gyre, mixes with coating liquid in the gyre, flows across the gyre, exits the gyre, and removes or otherwise displaces a portion of coating liquid from the gyre. Alternatively, the transverse flow of coating liquid can be directed around the gyre without entering the gyre. Heat transfer occurs from the gyre to the transverse flow of coating liquid to reduce the temperature of the gyre. Establishing a transverse flow includes recirculating coating liquid in a loop, where the coating liquid can be replenished from an external source as necessary and added to existing coating liquid in the coating chamber. A transverse flow of coating liquid from an external source can be supplied to a coating chamber to mitigate detrimental effects associated with gyres.

Figure 6A:
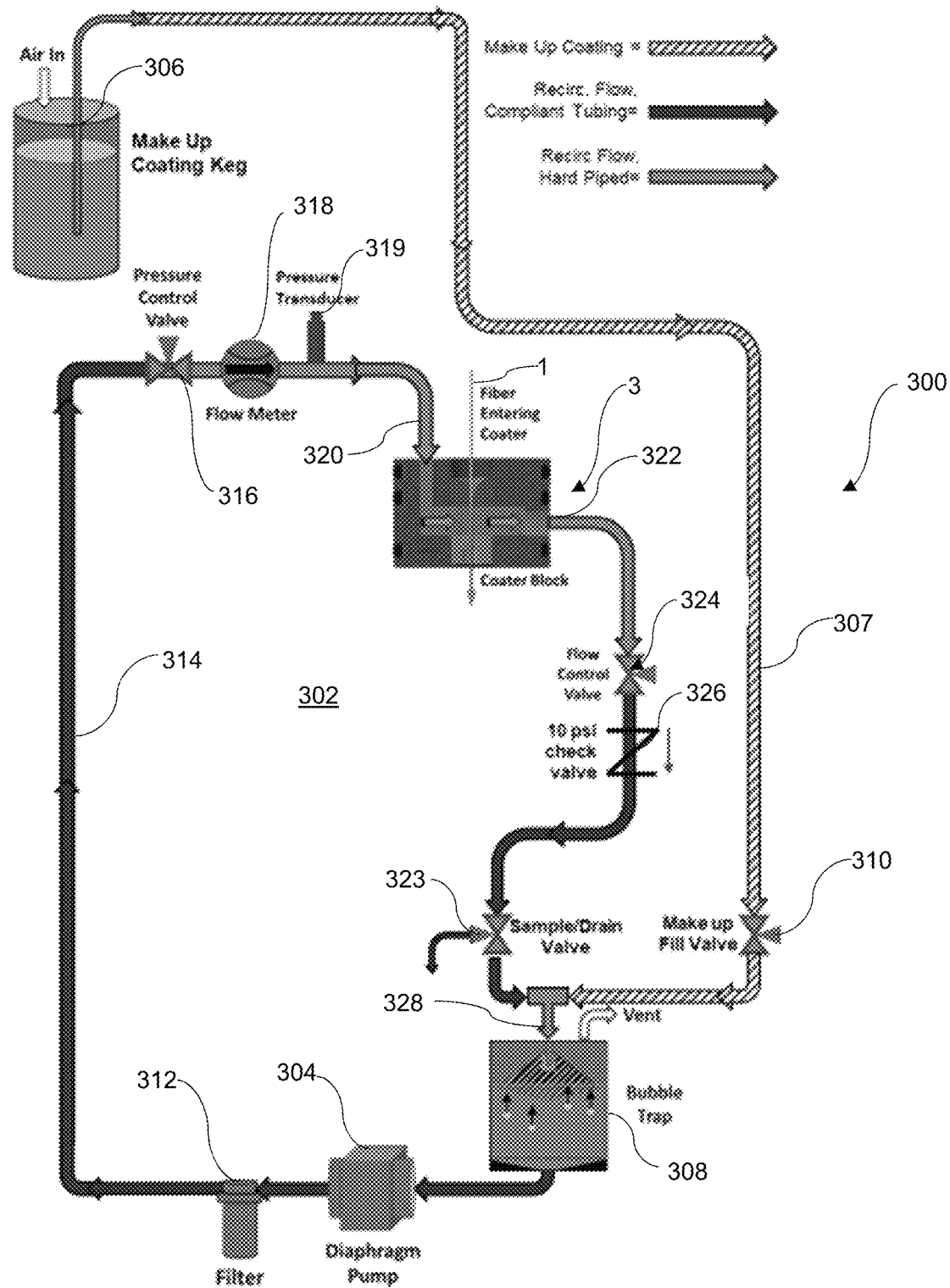
FIG. 6A is a schematic of an example of a system for supplying pressurized coating liquid to a coating application unit according to the disclosure.
Figure 6B:
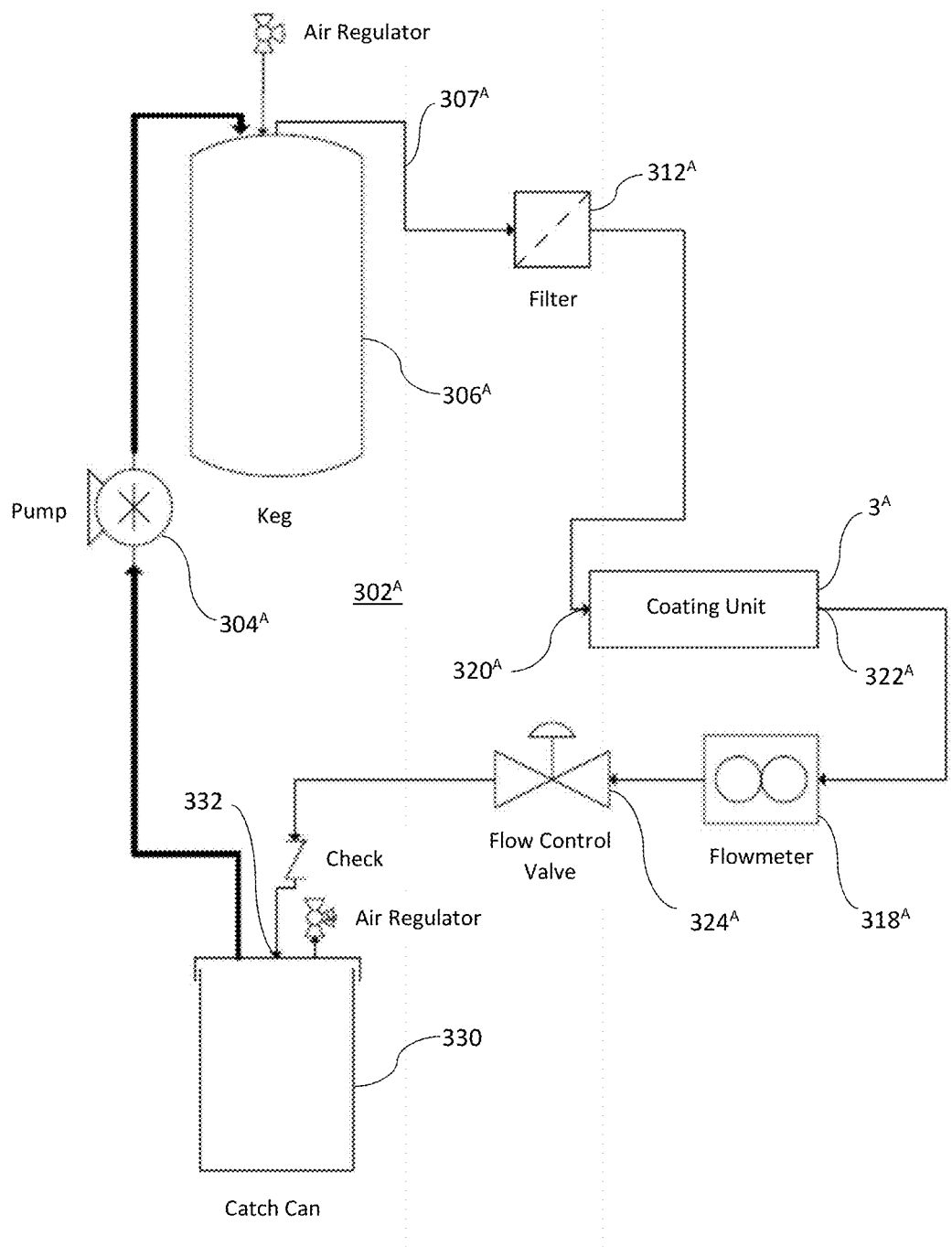
FIG. 6B is a schematic of an example of a system for supplying pressurized coating liquid, to a coating application unit according to the disclosure, with excess coating liquid flowing into a catch can and pumped to a make-up coating keg.

FIG. 6A is an example of a system 300 that establishes a flow (e.g., a transverse flow) by recirculating coating liquid in a recirculation loop 302 driven by pump 304, where the coating liquid can be replenished from an external source as necessary and added to existing coating liquid in the coating chamber. Although pump 304 is preferably a diaphragm pump, any suitable pump can be used, including peristaltic pumps.

The example system shown in FIG. 6A comprises an apparatus with recirculation loop 302 which is provided with make-up coating liquid from a pressurized coating liquid keg 306 via conduit 307. The make-up coating liquid system comprised of coating liquid keg 306, conduit 307, and flow control valve 310 maintains a constant level of coating liquid inside of bubble trap 308 using a level sensor (not shown) and flow control valve 310. The diaphragm pump 304 draws coating liquid from the bubble trap 308 and sends the coating liquid at high pressure through a particulate filter 312. The filtered coating liquid is next sent via conduit 314 to a pressure control regulator 316 where pressure is reduced to provide the desired application pressure to coating application unit 3. Next, the flowrate of the coating liquid is measured using a flowmeter 318 (e.g., an ultrasonic flow meter). Coating liquid is supplied to the coating chamber 7 of the coating application unit 3 via inlet 320. A portion of the coating liquid is entrained by fiber 1 and exits the coating chamber 7 through sizing die 9. A portion of the coating liquid exits coating chamber 7 of coating application unit 3 via outlet 322 and enters flow control valve 324, which can be used to control the through flow rate within recirculation loop 302. A check valve 326 can be placed downstream of the flow control valve 324 to prevent syphoning through the valve. Finally, the coating liquid passes through a three-port, two-position valve 328 before mixing with the make-up coating stream from conduit 307 and reentering the bubble trap 308 and repeating the cycle. A proportional-integral-derivative (PID) based control system (not shown) uses feedback from flowmeter 318 as well as a pressure transducer 319 near the coating application unit 3 to constantly adjust the fluid regulators (e.g., flow control valve 324) and control application pressure and flow rate throughout the recirculation loop 302.

The coating liquid, whether in the apparatus with recirculation loop 302 or from coating liquid keg 306, can be heated or not heated (e.g., heated to a temperature above 30° C.). The coating liquid can be heated by any suitable means known in the art prior to introduction into recirculation loop 302, e.g., from coating liquid keg 306, or after introduction into recirculation loop 302. Alternatively, or in addition, the coating liquid is not heated prior to entering the coating chamber.

System 300 supplies pressurized coating liquid to coating application unit 3, reclaims excess coating liquid, removes entrained bubbles in the coating liquid using bubble trap 308 and removes particles from the coating liquid using particulate filter 312 in the system via filtration. The pressure and flowrate at which the coating liquid is provided to the coating application unit 3 are each controlled independently (e.g., <1 psi and 2 cm³/min, respectively). The coating liquid in the bubble trap 308 is maintained at a relatively constant level using a level sensor (e.g., an ultrasonic sensor, a capacitive sensor or flotation device).

In the example shown in FIG. 6A, an air-operated diaphragm pump is used to deliver the coating liquid. Examples of pumps that give suboptimal results due to high shear rates on the coating liquid include gear, progressive cavity, and reciprocating piston pumps. The pump 304 can include an internal pressure intensifier, allowing the coating liquid discharge pressure to be up to four times higher than the air pressure used to drive the pump. Since standard house air is typically less than 100 psi, this ensures that the pump discharge pressure is always able to exceed the maximum pressure required in the coating chamber, which can be important to maintaining constant pressure with pressure control regulator 316. Due to the relatively high viscosity of the coating, high pump output pressures can also be important to overcome the substantial pressure drop encountered through lines (e.g., conduit 314) and other various components within the system.

An additional advantage to using an air-operated diaphragm pump is that the pump requires no control system to compensate for varying flowrates. Because these pumps operate off of air pressure alone, they are able to stall when downstream line pressure exceeds the pump discharge pressure. In this way, the pump is self-metering and automatically adjusts the rate at which it cycles to match the amount of flow that is demanded at that instant. Motor driven, positive displacement pumps would require a variable speed drive system controlled by a control system that receives either pressure or flowrate feedback to ensure that the pump output matches the system demand.

The interconnected units of system 300 are said to be "fluidly coupled". By fluidly coupled is meant that a fluid (e.g. coating liquid) passes between or among the interconnected units of system 300 during operation. Keg 306, for example is fluidly coupled to bubble trap 308, pump 304, filter 312, pressure control valve 316, flow meter 318, pressure transducer 319, inlet 320, outlet 322, and coating application unit 3. Corresponding interconnected units of the systems shown in FIGS. 6B-6E are also fluidly coupled.

Figure 8:
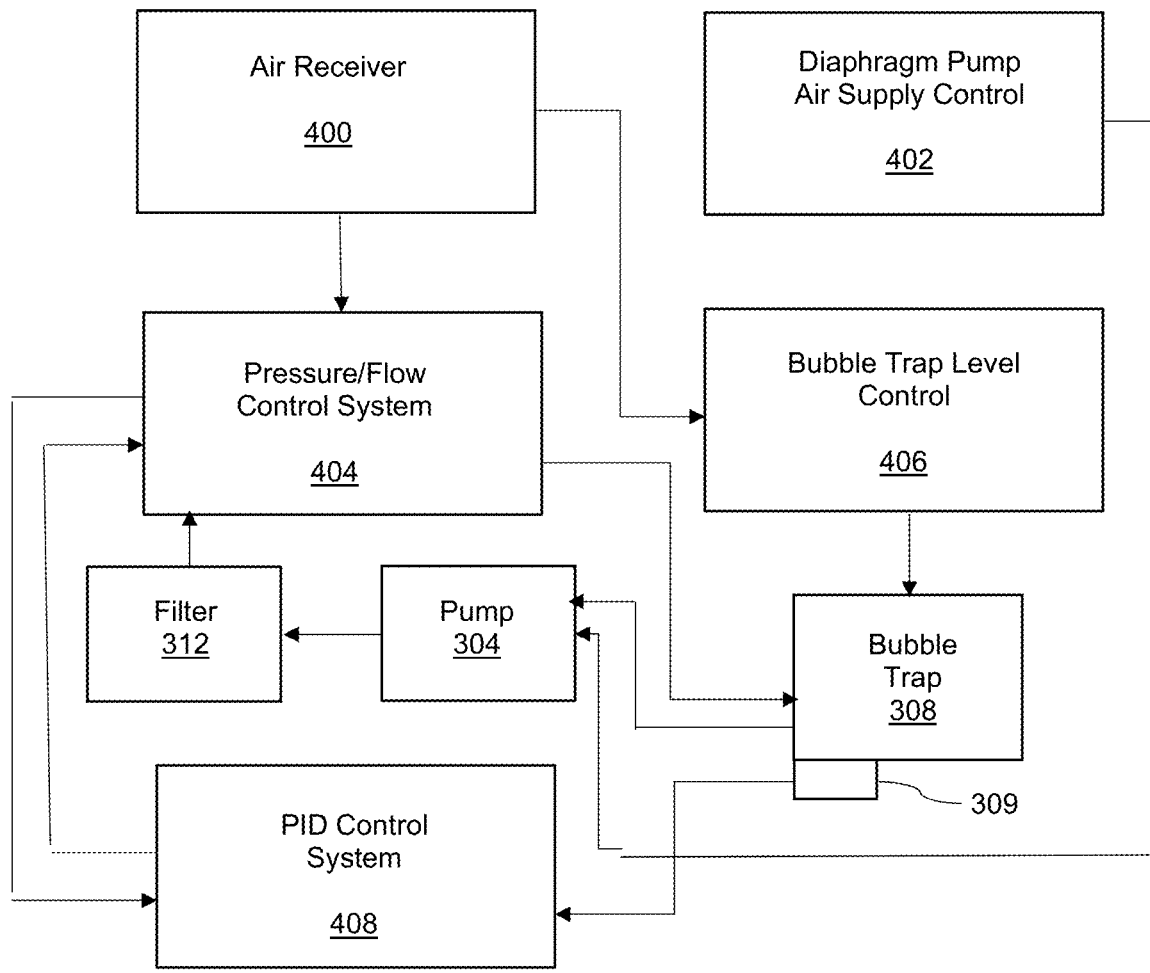
FIG. 8 is a schematic of a control system for a coating liquid recirculation loop.

The control system for the apparatus with recirculation loop 302 is shown in schematically in FIG. 8. There are three separate control loops that independently control bubble trap level, coating liquid application pressure, and the rate at which coating liquid is delivered to the coating chamber. These control loops are operated in combination by a draw computer (not shown) and two standalone controllers (pressure control regulator 316 and flow control valve 324) that make up proportional-integral-derivative (PID) based control system 408.

Bubble trap level control system 406 detects coating liquid level in the bubble trap 308 using any suitable level sensor 309 (e.g., an analog or a digital an ultrasonic sensor, a capacitive sensor or flotation device). When level sensor 309 signals a low level, the control loop responds by opening a refill valve (e.g., make up fill valve 310 in FIG. 6A) which allows coating liquid to travel from pressurized coating liquid keg (306 in FIG. 6A) via a conduit (307 in FIG. 6A) to bubble trap 308. The refill valve remains open until the bubble trap level has returned to an adequate level. A delay can be programmed into the closing of the refill valve so that the bubble trap will overfill slightly beyond the level which initially triggered the refill sequence to prevent rapid cycling of the valve. Alternatively, a proportionally controlled fill system (not shown) could be used in order to maintain a more consistent level within the bubble trap. The proportionally controlled fill system could control refill rate using a dedicated proportional fluid valve or by simply modulating the pressure within the pressurized coating keg using, e.g., an electropneumatic transducer.

Important to the operation of the apparatus with recirculation loop 302 is the precise and stable control of coating liquid application pressure and through flow rate. To ensure that a variety of pressure and flow conditions can be achieved within the coating application unit 3, it is important that the control system offer independent control of both variables, pressure and flow. Control of both variables can be achieved by precisely and simultaneously metering the volume of coating liquid that can both enter and exit coating application unit 3. This can be accomplished in multiple ways. One method employs two separate flow control valves, one on either side of the coating application unit 3.

The first flow control valve, pressure control valve 316, is used to control pressure within the coating application unit 3 by metering the rate at which coating liquid is allowed to enter via inlet 320. The second flow control valve, flow control valve 324, is used to control the rate at which coating is permitted to pass through the coating application unit 3 by metering the amount of coating liquid allowed to exit the coating application unit 3 volume via an outlet (e.g., outlet 322) or drain line 323 in FIG. 6A.

Figure 7:
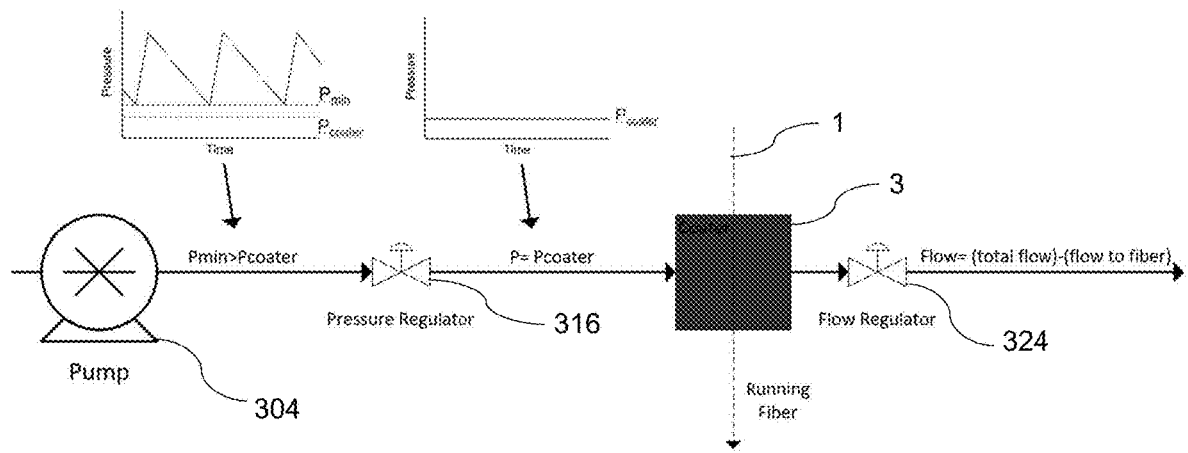
FIG. 7 is a schematic showing how a pressure control valve is able to maintain substantially uniform pressure output.

The approach exemplified in FIG. 6A utilizes a dome loaded, downstream pressure regulator (e.g., pressure control valve 316) to meter the flow of the coating liquid entering the coating application unit 3 and offers the advantage of delivering substantially uniform pressure control even when pressure upstream of the regulator (e.g., upstream from pressure control valve 316, in the direction of conduit 314, filer 312, and pump 304, whereas "downstream" refers to in the direction of pressure transducer 319 and coating application unit 3) is fluctuating. Most pumps suitable for handling coating liquids, including highly viscous and shear sensitive coating liquids, suffer from non-uniform pressure output as the pump completes each cycle or stroke. Even small fluctuations in output pressure can negatively impact the coating liquid flow rate through the coating application unit 3 and cause variations in the diameter of coating liquid placed on fiber 1 and the ultimate coated diameter of cured coating liquid placed on fiber 1. As long as the minimum pump output pressure is maintained above the desired coating liquid application pressure downstream of pressure control valve 316, the valve or regulator is able to maintain substantially uniform pressure output. FIG. 7 is a schematic showing how the pressure control valve 316 is able to maintain substantially uniform pressure output.

By balancing the rate at which coating liquid enters and leaves the fixed volume of the coating chamber of the coating application unit, it is possible to specify a wide range of pressure and flow combinations within the coating chamber. The range of controllable pressure and flow is only limited by, e.g., the frictional losses of the coating liquid through the regulators (e.g., pressure control valve 316 and flow control valve 324) and thus the differential pressure across the regulators. For instance, maximum flowrate can be limited by the amount of pressure (dictated by the pressure regulator) available to drive the coating liquid through flow control valve 324 at the fully open position. Higher coating application unit pressures can enable higher flowrates. Additionally, maximum pressure within the coating application unit (supplied by upstream pressure control valve 316) will be limited by higher flowrates although this constraint can be overcome by supplying higher pressures at the pump outlet.

Figure 6C:
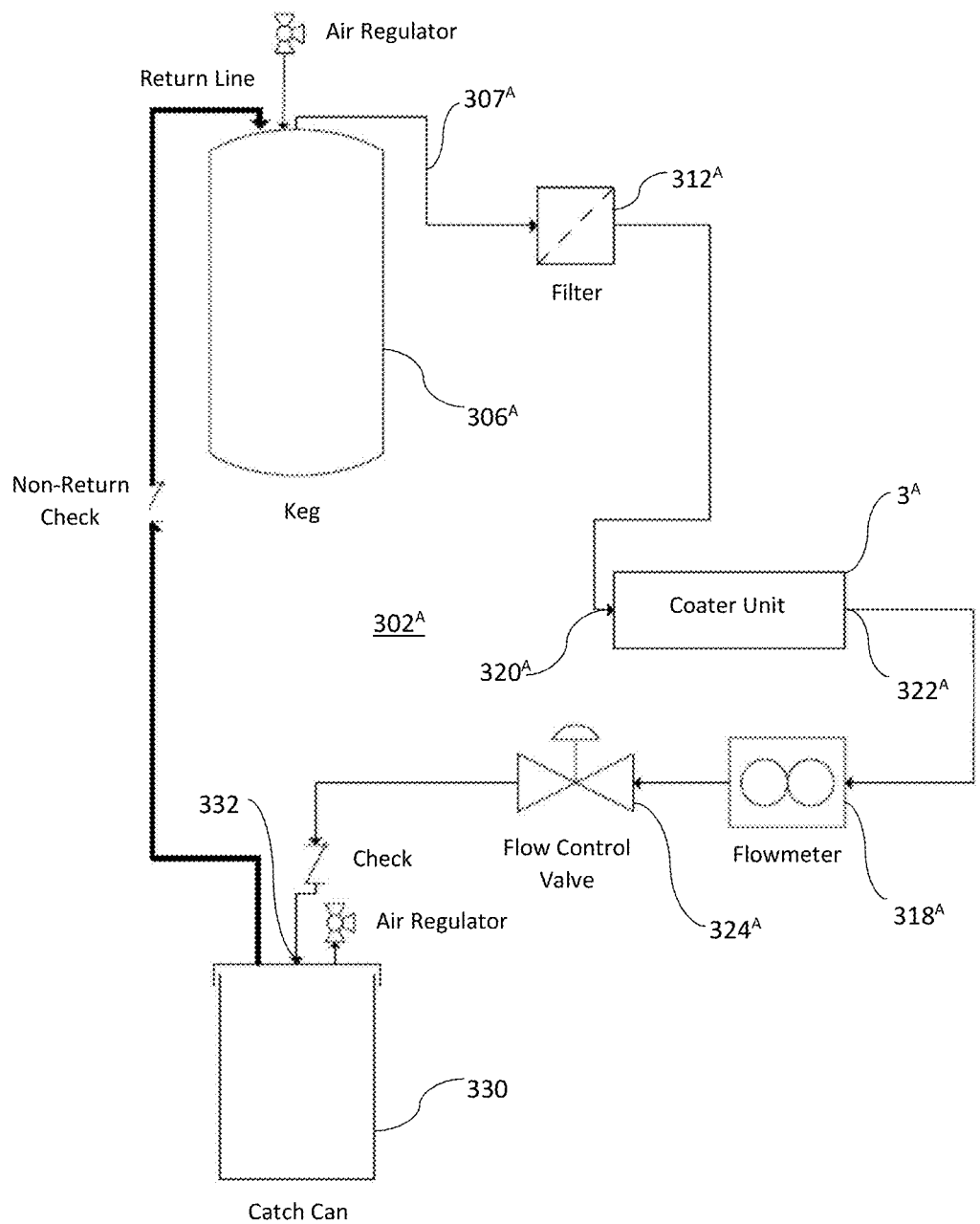
FIG. 6C is a schematic of an example of a system for supplying pressurized coating liquid, to a coating application unit according to the disclosure, with excess coating liquid flowing into a catch can and pressure-returned to a make-up coating keg.
Figure 6D:
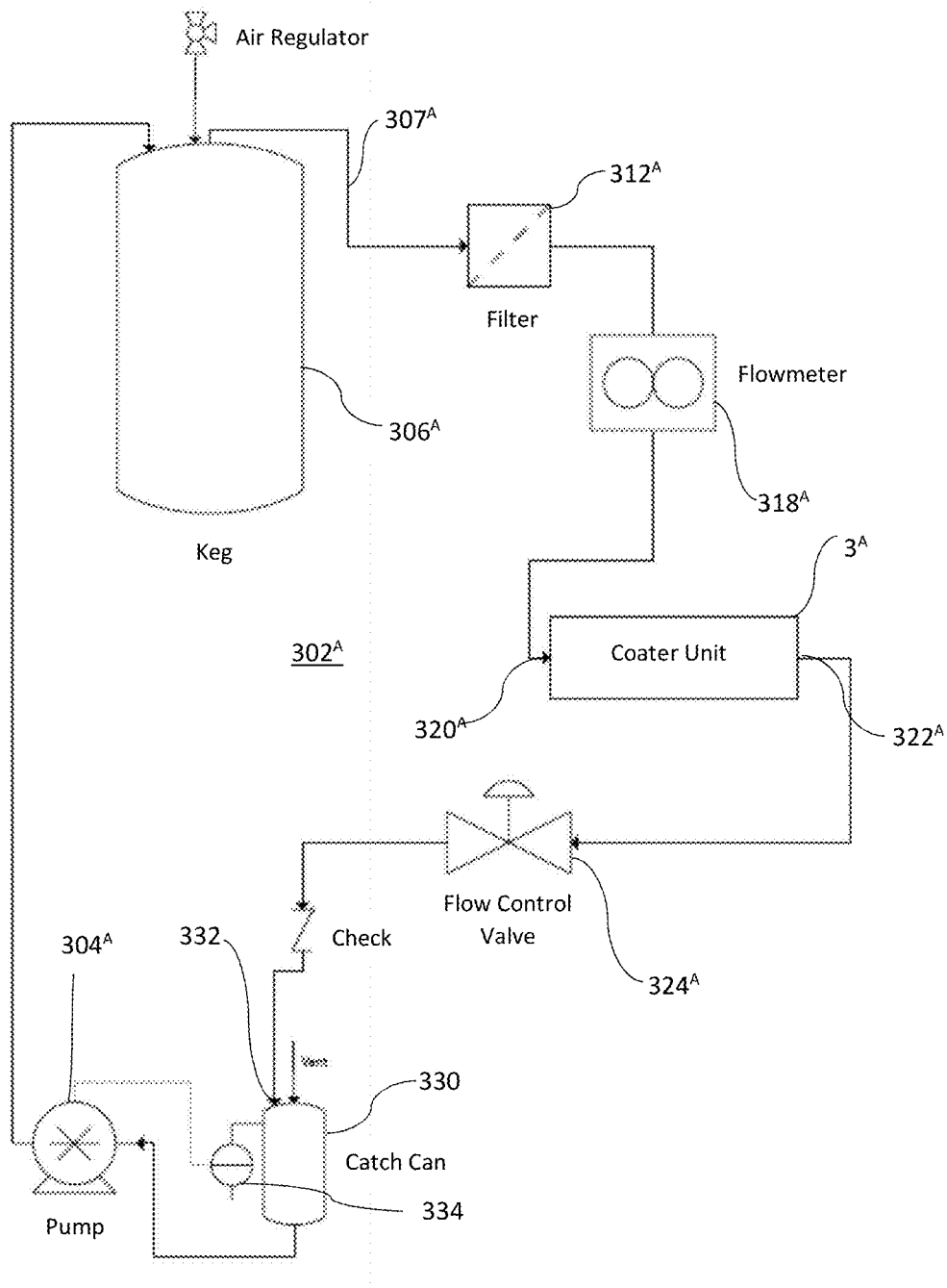
FIG. 6D is a schematic of an example of a system for supplying pressurized coating liquid, to a coating application unit according to the disclosure, with excess coating liquid flowing into a catch can and continuously pumped to a make-up coating keg.

FIGS. 6B-6F show additional examples of systems that establish a flow (e.g., a transverse flow) by recirculating coating liquid. The example system shown in FIG. 6B comprises an apparatus with recirculation loop 302$^A$ which is provided with make-up coating liquid from a pressurized coating liquid keg 306$^A$ via conduit 307A including a particulate filter 312A. The filtered coating liquid is provided to the coating application unit 3$^A$ via inlet 320A where a portion of this coating liquid leaves the system onto the fiber (not shown). The remainder exits coating application unit 3$^A$ via outlet 322$^A$ and enters flow control valve 324$^A$, which can be used to control the through flow rate within the apparatus with recirculation loop 302$^A$. The example shown in FIG. 6B includes flowmeter 318$^A$ between coating application unit 3$^A$ and flow control valve 324$^A$. Apparatus with recirculation loop 302$^A$ also includes a catch can 330 into which excess coating liquid enters via conduit 332 and is collected. Excess coating liquid collected in catch can 330 is then pumped with pump 304$^A$ into pressurized coating liquid keg 306$^A$. Catch can 330 is preferably pressurized to contain and maintain the coating liquid at a pressure above atmospheric pressure. FIG. 6D shows an alternative example where excess coating liquid is continuously pumped with pump 304$^A$. The example in FIG. 6D shows a level sensor 334 that can be used to send feedback to pump 304$^A$. If the level in catch can 330 falls below a certain level, pump 304$^A$ can stop pumping, allowing the level in catch can 330 to recover. The example in FIG. 6C is similar to the one shown in FIG. 6B, except that excess coating liquid collected in catch can 330 is transferred into pressurized coating liquid keg 306$^A$ with the use of air pressure, as opposed to pumped with pump 304$^A$.

Figure 6E:
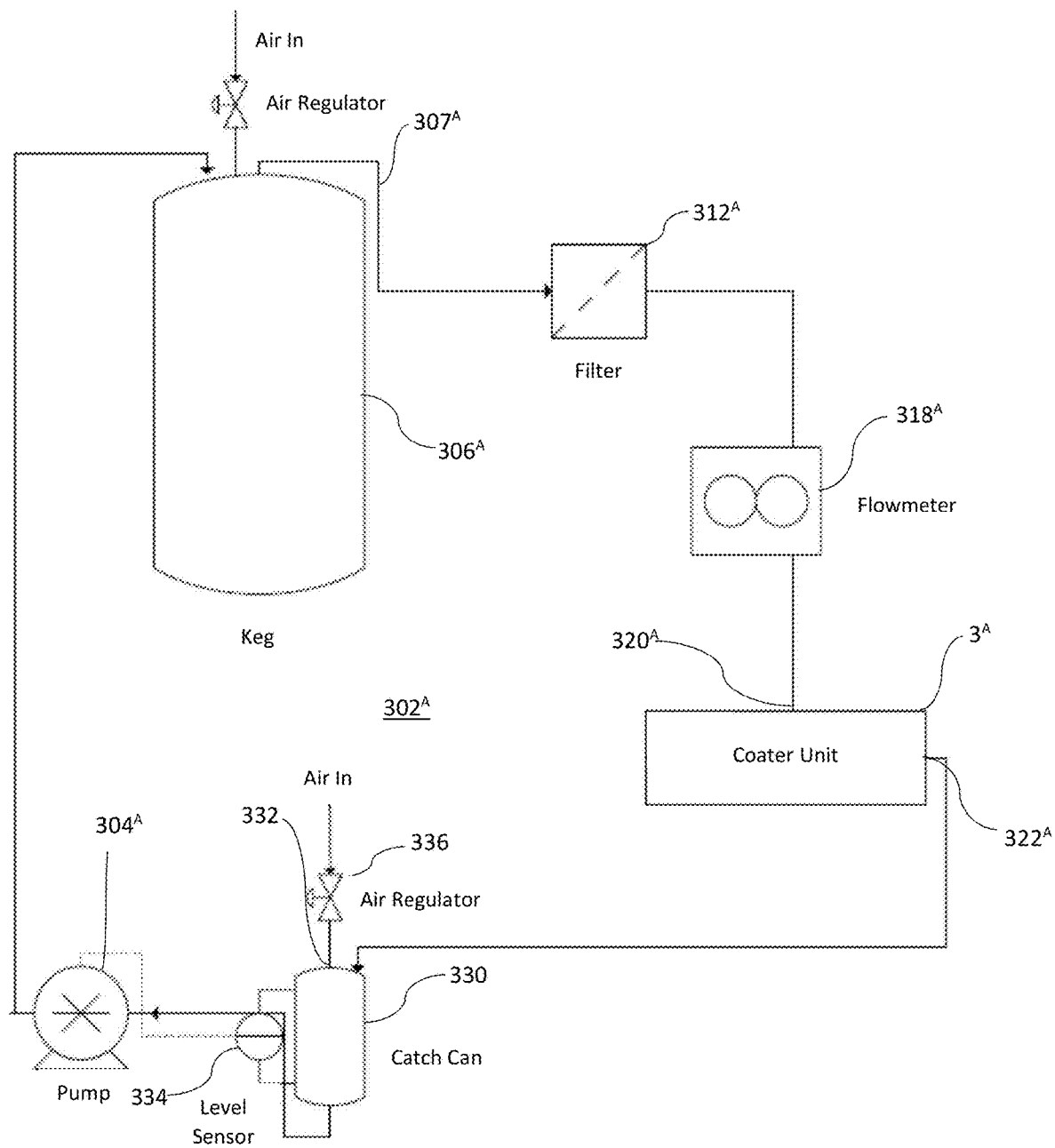
FIG. 6E is a schematic of an example of a system for supplying pressurized coating liquid, to a coating application unit according to the disclosure, with excess coating liquid flowing into a catch can and continuously pressure-returned to a make-up coating keg.

An additional example is provided in FIG. 6E. In this example, the apparatus with recirculation loop 302$^A$ can operate either continuously, or in a batch style if the catch can 330 is large enough to accommodate all of the excess coating liquid that would accumulate throughout the course of a run. In this example, flowrate is controlled by regulating air pressure in the headspace of the catch can 330 by way of regulator 336. By regulating this pressure, a pressure differential can be controlled and maintained between the coating liquid keg 306$^A$ and catch can 330. By controlling the differential pressure between coating liquid keg 306$^A$ and catch can 330, flow rate of coating liquid through coating application unit 3$^A$ is controlled. By controlling the pressure of just the coating liquid keg 306$^A$, while maintaining a fixed pressure differential with the catch can 330, then pressure inside application unit 3$^A$ can be controlled. As is the case in FIG. 6D, level sensor 334 that can be used to send feedback to pump 304$^A$. If the level in catch can 330 falls below a certain level, pump 304$^A$ can stop pumping, allowing the level in catch can 330 to recover.

Figure 6F:
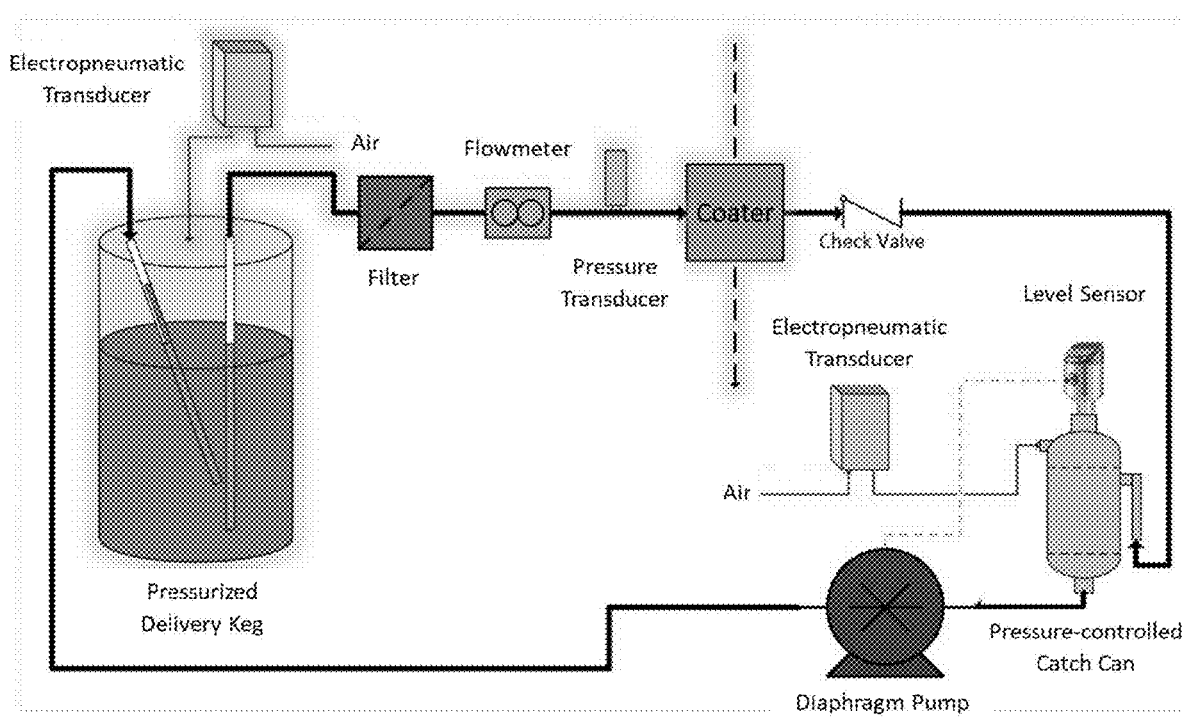
FIG. 6F is a schematic of an example of a system for supplying pressurized coating liquid, to a coating application unit according to the disclosure, with excess coating liquid flowing into a catch can and continuously pressure-returned to a make-up coating keg.

An additional example is provided in FIG. 6F. The example shown in FIG. 6F is of a system lacking fluid regulators for pressure and flow control. In this example, air pressure is used on the upstream coating liquid keg (labeled "pressurized delivery keg" in FIG. 6F) and downstream catch can (labeled "pressure-controlled catch can" in FIG. 6F) to control pressure and flowrate.

Keg 306, 306$^A$ and catch can 330 are preferably pressurized to contain and maintain the coating liquid at a pressure above atmospheric pressure. The pressure of keg 306, 306$^A$ when pressurized is greater than the pressure of catch can 330 when pressurized. The pressure of keg 306, 306$^A$ is preferably between 20 psi and 70 psi, or between 30 psi and 65 psi, or between 40 psi and 60 psi, or about 50 psi. The pressure of catch can 330 is preferably between 5 psi and 50 psi, or between 10 psi and 45 psi, or between 15 psi and 40 psi, or about 30 psi. The pressure of keg 306, 306$^A$ when pressurized is preferably at least 5 psi, or at least 10 psi, or at least 20 psi, or at least 30 psi, or between 10 psi and 40 psi, or between 15 psi and 30 psi greater than the pressure of catch can 330 when pressurized.

Making reference to the system exemplified in FIG. 8, pressure and flow control system 404 can each, independently, consist of a pneumatically piloted, dome loaded fluid regulator (e.g., flow control valve 324), an electropneumatic transducer (I/P converter; not shown), a PID controller (not shown), and a feedback source, such as a pressure transducer (e.g., pressure transducer 319) or flowmeter (e.g., flow meter 318), respectively. Coating application unit 3 is part of pressure and flow control system 404. In this example, the dome loaded regulator operates by balancing pressure on either side of a flexible control diaphragm. The position of the diaphragm directly controls the position of the fluid valve within the regulator and thus the amount of flow that is permitted to pass through flow control valve 324. One side of the diaphragm is in communication with the fluid downstream of the regulator while the opposite side of the diaphragm is in communication with, e.g., a pilot gas (e.g., air or even an inert gas, such as nitrogen). The pressure of this pilot gas is precisely controlled using an I/P converter. If an imbalance of pressure on either side of the diaphragm occurs, the diaphragm will deform toward the side of lower pressure, adjusting the fluid control valve position and permitting more or less flow to enter the fluid side of the diaphragm cavity, naturally driving the pressure on the fluid side towards an equilibrium with the air side. In other words, flow control valve 324 operates in manner that continuously balances fluid outlet pressure with the pilot air pressure.

Once again making reference to FIG. 8, PID control system 408 monitors the current process value (PV) via feedback from its respective sensor (e.g., pressure transducer 319 for the pressure control loop and flowmeter 318 for the flow control loop). It then compares this PV with a target PV value that is sent to the PID control system 408 from the draw computer (not shown). This target is calculated based on draw tractor speed. The controller then calculates the appropriate response output to be sent to the I/P converter (e.g., an I/P converter located within pressure/flow control system 404, which makes a corresponding adjustment to the pilot air pressure that is being transmitted to flow control valve 324.

Since both control loops run simultaneously and are interdependent, a change to one can provoke an upset in the other. To avoid any cross talk between the two control loops and the instability that could result, it can be beneficial that the two loops operate on different time scales. The ability to have very rapid pressure feedback makes it possible to design a very responsive pressure control loop. Flow control feedback, however, can be much slower as a flow meter usually waits to gather multiple samples before reporting an average flowrate. For this reason, it can be desirable to tune the pressure control algorithm to respond to error rapidly, while the flow control loop should be tuned to adjust to error smoothly and slowly. In doing this, the pressure control loop is able to quickly adjust to pressure changes caused by a slow-moving pressure control response and maintain uniform pressure within the coating application unit volume. Additionally, the use of a dome-loaded regulator for flow control can make the flow control loop virtually insensitive to any upstream pressure fluctuations imparted by the pressure control loop.

Although the system described in FIGS. 6A-E and 8 herein is considered to be an example of an exemplary system, independent control of pressure and flow can also be achieved using other hardware configurations. For instance, the use of a downstream regulator positioned between the pump and coating application unit could be used for control of flowrate while a back-pressure regulator placed downstream of the coating application unit could be used to control pressure inside the coating application unit. A potential drawback to this configuration, however, could be increased likelihood of cross talk between the two control loops. Because the back-pressure regulator would be referencing the pressure within the coating application unit, a pressure change caused by a setpoint change to the upstream flow regulator could send the pressure control loop into an oscillation. Since both regulators would be referencing the same volume, the reverse is also true. Another configuration could use a motor-driven, positive displacement pump with a variable-speed drive to control flow rate by modulating the speed of the pump. This type of configuration could be outfitted with a back-pressure regulator downstream of the pump used to control coating application unit pressure. In practice, however, it can difficult to find a pump that is suitable for the viscosity and shear requirements of the coating while providing pulsation-free pressure output as the pump cycles.

As discussed herein, FIG. 6A is an example of a system 300 that establishes a flow (e.g., a transverse flow) by recirculating coating liquid in an apparatus with recirculation loop 302 driven by pump 304, where the coating liquid can be replenished from an external source as necessary and added to existing coating liquid in the coating chamber. Flowing of the coating liquid as described herein, and as described in FIGS. 6A-E and 8, is designed to, among other things, reduce the cost of optical fiber manufacturing by mitigating the effects of the gyre in several ways.

First, the temperature of the coating liquid in the transverse flow at its point of entry to the coating chamber can be controlled and maintained at a temperature below the maximum, average or minimum temperature of coating liquid contained in the gyre. When the cooler coating liquid of the transverse flow interacts with the warmer coating fluid of the gyre, the gyre cools. As the gyre cools, the coating liquid in the gyre becomes less buoyant and more viscous. This reduces the likelihood of escape of the coating liquid from the gyre. To the extent that coating liquid does escape from the gyre, the reduced buoyancy lower temperature and higher viscosity lessen the likelihood that coating liquid from the gyre will reach the meniscus. If coating liquid from the gyre does reach the meniscus, the lower temperature and higher viscosity mean that higher pressure is needed to force it into the guide die. The likelihood of flooding is accordingly reduced. By maintaining a continuous flow (e.g., transverse flow) of coating liquid and continuously removing coating liquid, the temperature of coating liquid within the gyre can be managed.

Second, the cooling of the coating liquid provided by the transverse flow also reduces temperature gradients in the gyre and the difference between the average temperature of the gyre and the surrounding coating fluid. The greater equalization in temperature leads to a more homogeneous coating liquid with more stable and consistent properties (e.g. gyre flow pattern, density, viscosity). Better homogeneity can improve uniformity and concentricity of coating.

Third, displacement and removal of coating liquid in the coating chamber, whether in the gyre or surrounding the gyre, decreases the concentration of bubbles in the coating chamber. The presence of at least one bubble trap 308 used in the methods and systems described herein also decreases or eliminates the concentration of bubbles in the coating chamber. The coating liquid of the transverse flow has not been subjected to entrained gases in the coating chamber and enters the coating chamber essentially free of bubbles. And even if there are entrained gases that ultimately lead to the formation of bubbles, the bubbles can be removed in a bubble trap. The transverse flow of coating liquid thus dilutes the concentration of bubbles in the coating chamber. Removal from the coating chamber of coating liquid that contains bubbles leads to a reduction in bubble concentration. A lower bubble concentration minimizes the likelihood of dewetting and flooding. A lower bubble concentration can also eliminate random, chaotic motion in the gyre, which leads to better concentricity through a more consistent, stabilized flow pattern in the gyre and a reduced tendency for coating liquid to escape from the gyre.

Fourth, recirculation of coating liquid according to the methods in the coating chamber lowers the concentration of dissolved gases in the coating fluid. As noted above, gas can enter the coating chamber through entrainment by the fiber as it exits the guide die. Entrainment can lead to dewetting and is undesirable. Gas can enter the coating chamber, however, even when the fiber is properly wetted. Wetting of the fiber includes formation of a meniscus of coating liquid on the fiber as the fiber enters the coating liquid. As the meniscus forms, the gas boundary layer on the fiber is displaced. The meniscus, however, is exposed to gas from the displaced boundary layer. Common process gases present in the guide die (e.g. air, $CO_2$, He) are soluble in the coating liquids typically used to coat fibers. As the draw process is operated over time, the concentration of gas dissolved in the coating liquid increases and ultimately reaches a saturation level.

Two adverse effects occur when the coating liquid is saturated with gas. First, dissolution of gas into the coating liquid is one of the steps associated with the wetting process. The speed of wetting is related to the permeability of the gas from the gas boundary layer of the fiber into the coating liquid. See, e.g., Journal of Fluid Mechanics 455: 347-358 (2002).) Gas permeability is proportional to solubility and rate of diffusion of the gas in the coating liquid. If the coating liquid is saturated with gas, further gas is unable to dissolve in the coating liquid and gas from the gas boundary layer of the fiber cannot enter the coating liquid. Dewetting can occur as a result. Second, the inability of gas to dissolve in the coating liquid increases the likelihood of bubble formation in the coating liquid. Dissolution of gas in the coating liquid removes gas that might otherwise form bubbles in the coating liquid. Through dissolution, bubble formation is inhibited. If the coating liquid becomes saturated with gas, however, dissolution is no longer possible and incorporation of gas in the form of bubbles in the coating liquid becomes more prevalent. At a minimum, bubble trap 308 effectively eliminates the formation of bubbles.

Fifth, the reduction in the temperature of coating liquid in the coating chamber increases the solubility of common process gases in the coating liquid. Higher solubility leads to greater dissolution of gases in the coating liquid and longer times before saturation occurs. This allows for longer operational times before concerns about dewetting and bubble entrapment associated with saturation of the coating liquid arise.

Recirculation of the coating liquid includes directing a stream of coating liquid in the space between the exit of the guide die and the entrance of the sizing die. This space defines a channel through which coating liquid flows, e.g., in a transverse direction. The process pathway is coincident with the optical fiber and extends from the exit of the guide die to the entrance of the sizing die. The transverse flow sweeps across, through, and/or around the process pathway to mix with, dilute, remove or otherwise interact (thermally or mechanically) with coating liquid present in the coating chamber. The rate of flow can be greater than 0.1 $cm^3$/s, or greater than 0.2 $cm^3$/s, or greater than 0.3 $cm^3$/s, or greater than 0.4 $cm^3$/s, or greater than 0.5 $cm^3$/s, or greater than 0.75 $cm^3$/s, or greater than 1.0 $cm^3$/s, greater than 2.5 $cm^3$/s, or greater than 5.0 $cm^3$/s, or in the range from 0.1 $cm^3$/s –20 $cm^3$/s, or in the range from 0.1 $cm^3$/s-10 $cm^3$/S, or in the range from 0.1 $cm^3$/s-5.0 $cm^3$/s, or in the range from 0.2 $cm^3$/s –20 $cm^3$/s, or in the range from 0.2 $cm^3$/s –10 $cm^3$/s, or in the range from 0.2 $cm^3$/s-5.0 $cm^3$/s, or in the range from 0.5 $cm^3$/s –20 $cm^3$/s, or in the range from 0.5 $cm^3$/s –10 $cm^3$/s, or in the range from 0.5 $cm^3$/s-5.0 $cm^3$/s.

Figure 9:
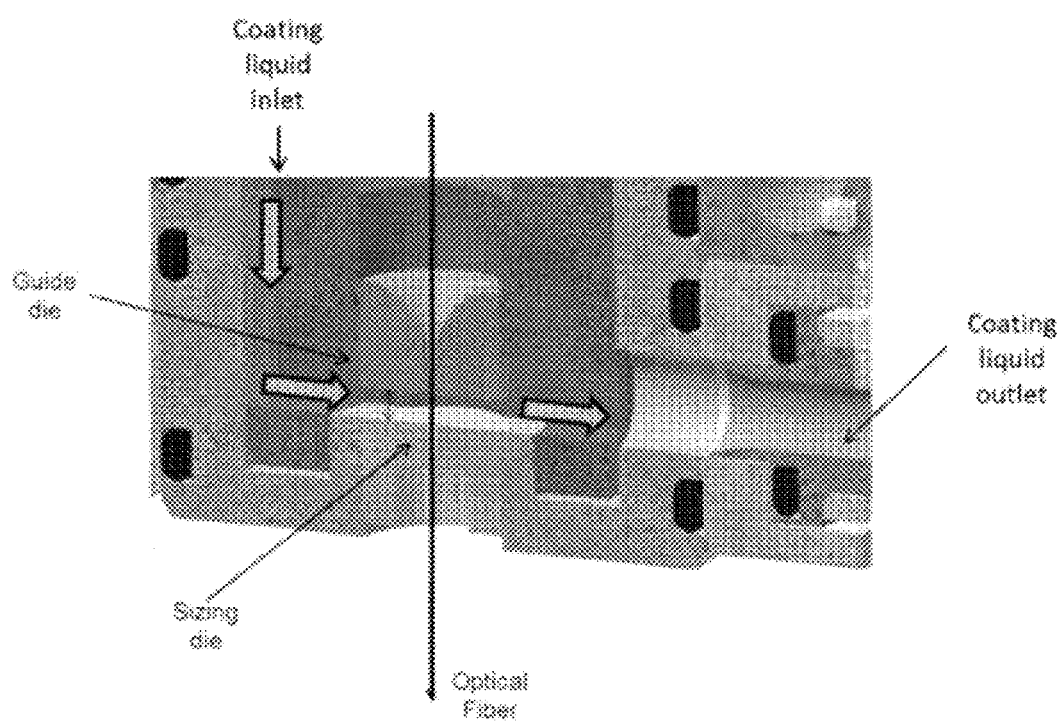
FIG. 9 is a cross section coating chamber positioned between a guide die and a sizing die.

To accommodate a transverse flow of coating liquid, the coating chamber is adapted to include an inlet for delivering coating liquid and an outlet for recirculation. The inlet and outlet are distinct from the entrance and exit points of the fiber into the coating chamber (i.e. distinct from openings in the guide die and sizing die through which the fiber enters and exits the coating chamber). FIG. 9 shows a cross-section of a coating chamber that includes an inlet and an outlet. The transverse flow of the coating liquid is depicted with gray arrows in FIG. 9. In this example, the coating liquid flows from the inlet into the coating chamber and in a transverse direction in a channel between the guide die and the sizing die past the optical fiber. At steady state, the amount of coating liquid removed at the outlet is approximately equal to the amount of coating liquid supplied at the inlet. An exact balancing of the amounts of coating liquid at the inlet and outlet does not occur due to removal of coating liquid in the form of a thin layer on the optical fiber at the sizing die and, if present, leakage of coating liquid into the guide die.

As shown in FIG. 5, the gyre can occupy a substantial portion of the distance between the fiber entrance to the coating chamber and the fiber exit from the coating chamber. Consequently, as shown in FIG. 9, to promote mitigation of the effects of the gyre on wetting of the fiber, it is preferable for the coating liquid to interact with a significant portion of the gyre. In FIG. 9, the fiber entrance to the coating chamber corresponds to the exit of a guide die and the fiber exit from the coating chamber corresponds to the entrance to the sizing die.

To increase the interaction of the coating liquid with the gyre, the cross-sectional dimension of the transverse flow of coating liquid is greater than 30% of the distance between the exit of the guide die and the entrance of the sizing die, or greater than 40% of the distance between the exit of the guide die and the entrance of the sizing die, or greater than 50% of the distance between the exit of the guide die and the entrance of the sizing die, or greater than 70% of the distance between the exit of the guide die and the entrance of the sizing die, or greater than 90% of the distance between the exit of the guide die and the entrance of the sizing die, or in the range from 30%-100% of the distance between the exit of the guide die and the entrance of the sizing die, or in the range from 50%-100% of the distance between the exit of the guide die and the entrance of the sizing die, or in the range from 70%-100% of the distance between the exit of the guide die and the entrance of the sizing die, or in the range from 30%-90% of the distance between the exit of the guide die and the entrance of the sizing die.

In addition, or alternatively, the cross-sectional dimension of the transverse flow of coating liquid is greater than 30% of the distance between the fiber entrance to the coating chamber and the fiber exit from the coating chamber, or greater than 40% of the distance between the fiber entrance to the coating chamber and the fiber exit from the coating chamber, or greater than 50% of the distance between the fiber entrance to the coating chamber and the fiber exit from the coating chamber, or greater than 70% of the distance between the fiber entrance to the coating chamber and the fiber exit from the coating chamber, or greater than 90% of the distance between the fiber entrance to the coating chamber and the fiber exit from the coating chamber, or in the range from 30%-100% of the distance between the fiber entrance to the coating chamber and the fiber exit from the coating chamber, or in the range from 50%-100% of the distance between fiber entrance to the coating chamber and the fiber exit from the coating chamber, or in the range from 70%-100% of the distance between fiber entrance to the coating chamber and the fiber exit from the coating chamber, or in the range from 30%-90% of the distance between the fiber entrance to the coating chamber and the fiber exit from the coating chamber.

The cross-sectional dimension of the flow of coating liquid can be controlled by the dimensions of the inlet that supplies the transverse flow of coating liquid to the coating chamber. The inlet includes an opening at the interface with the coating chamber through which the flow of coating liquid is supplied. The inlet has a cross-sectional area determined by the size and shape of the opening and is characterized by a cross-sectional dimension. The cross-sectional dimension of the inlet corresponds to the longest line segment that connects two points of the perimeter of the opening.

Thus, for example, the cross-sectional dimension of the inlet is greater than 30% of the distance between the fiber entrance to the coating chamber and the fiber exit from the coating chamber, or greater than 40% of the distance between the fiber entrance to the coating chamber and the fiber exit from the coating chamber, or greater than 50% of the distance between the fiber entrance to the coating chamber and the fiber exit from the coating chamber, or greater than 70% of the distance between the fiber entrance to the coating chamber and the fiber exit from the coating chamber, or greater than 90% of the distance between the fiber entrance to the coating chamber and the fiber exit from the coating chamber, or in the range from 30%-100% of the distance between the fiber entrance to the coating chamber and the fiber exit from the coating chamber, or in the range from 50%-100% of the distance between fiber entrance to the coating chamber and the fiber exit from the coating chamber, or in the range from 70%-100% of the distance between fiber entrance to the coating chamber and the fiber exit from the coating chamber, or in the range from 30%-90% of the distance between the fiber entrance to the coating chamber and the fiber exit from the coating chamber.

In addition, or alternatively, the cross-sectional dimension of the inlet is greater than 30% of the distance between the exit of the guide die and the entrance of the sizing die, or greater than 40% of the distance between the exit of the guide die and the entrance of the sizing die, or greater than 50% of the distance between the exit of the guide die and the entrance of the sizing die, or greater than 70% of the distance between the exit of the guide die and the entrance of the sizing die, or greater than 90% of the distance between the exit of the guide die and the entrance of the sizing die, or in the range from 30%-100% of the distance between the exit of the guide die and the entrance of the sizing die, or in the range from 50%-100% of the distance between the exit of the guide die and the entrance of the sizing die, or in the range from 70%-100% of the distance between the exit of the guide die and the entrance of the sizing die, or in the range from 30%-90% of the distance between the exit of the guide die and the entrance of the sizing die.

The temperature and/or flow rate of coating liquid supplied at the inlet can be controlled to manage the thermal environment of coating liquid in the coating chamber or in the gyre. The temperature of coating liquid supplied at the inlet is less than the maximum temperature of coating liquid in the gyre, or less than the average temperature of coating liquid in the gyre, or less than the minimum temperature of coating liquid in the gyre, or less than the average temperature of the coating liquid in the coating chamber that is outside of the gyre.

Management of the thermal environment of the coating liquid includes minimizing the difference in temperature of coating liquid within the gyre. By including transverse flow of coating liquid in the channel between the guide die and sizing die, the difference between the maximum temperature of coating fluid in the gyre and the minimum temperature of coating fluid in the gyre is less than 80° C., or less than 60° C., or less than 50° C., or less than 40° C., or less than 30° C.

Thus, for example, the temperature of coating liquid supplied at the inlet of the coating chamber is less than the average temperature of coating fluid in the gyre by at least 5° C., at least 10° C., or at least 20° C., or at least 30° C., or by an amount in the range from 5° C.-40° C., or by an amount in the range from 10° C.-30° C.

Management of the thermal environment of the coating liquid includes minimizing the difference in the temperatures of coating liquid in the gyre and in the coating liquid surrounding the gyre. The flow of coating liquid in the channel between the guide die and the sizing die causes the difference between the maximum temperature of coating fluid in the gyre and the temperature of coating fluid surrounding the gyre to be less than 80° C., or less than 60° C., or less than 50° C., or less than 40° C., or less than 30° C.

A coating assembly in accordance with the disclosure is utilized in the application of one or more coatings to the optical fiber. A typical optical fiber includes a low modulus primary coating on the glass fiber and a high modulus secondary coating on the primary coating. A coloring layer is often formed on the secondary coating as well. The benefits associated with transverse flow of coating liquid extend to any of the coatings formed on an optical fiber. When applying multiple coatings to the fiber, a liquid primary coating composition is applied to the fiber at a point along the process pathway upstream of the point at which a liquid secondary coating composition is applied to the fiber. In one embodiment, the liquid primary coating composition is cured before applying the liquid secondary coating composition (wet-on-dry process). In another embodiment, the liquid primary coating composition is uncured before applying the liquid secondary coating composition (wet-on-wet process). If applied, the liquid coloring layer composition is applied at a position along the process pathway downstream from the point of application of the liquid secondary coating composition. In one embodiment, the liquid secondary coating composition is cured before applying the liquid coloring layer composition (wet-on-dry process). In another embodiment, the liquid secondary coating composition is uncured before applying the liquid coloring layer composition (wet-on-wet process).

Figure 10:
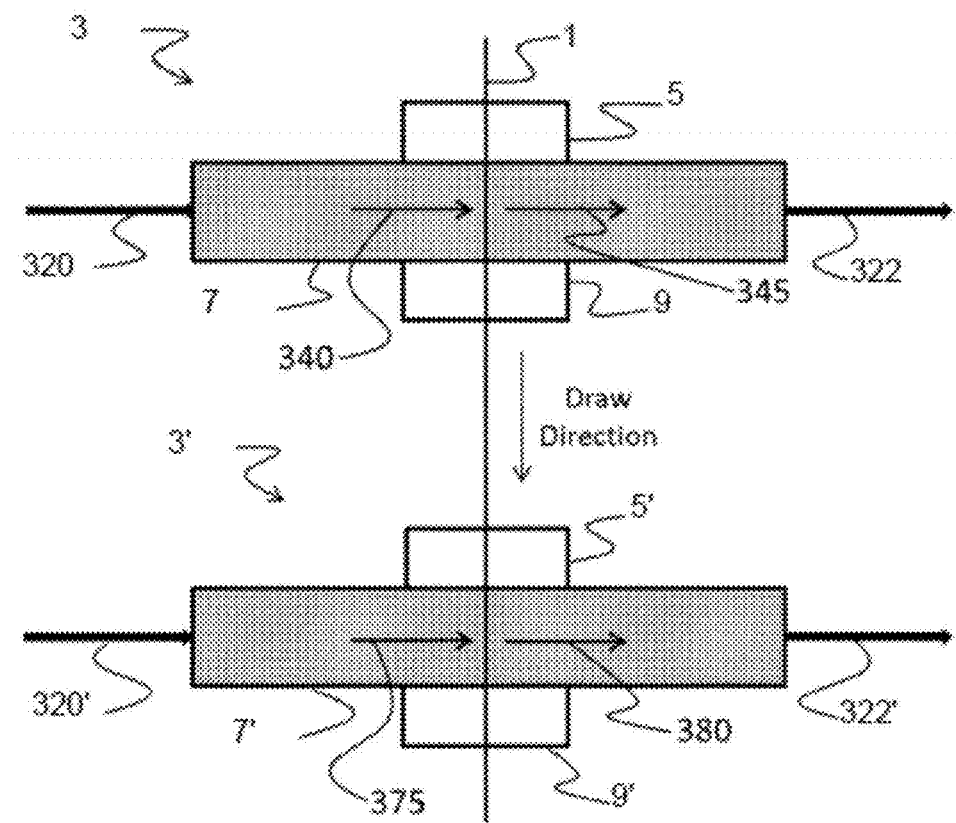
FIGS. 10 and 11 are schematics of a coating application unit with coating chambers for applying a primary coating liquid and a secondary coating liquid to an optical fiber.

FIG. 10 illustrates an example in which primary and secondary coating liquids are applied to an optical fiber in a wet-on-wet process. Coating application unit 3 is used to apply a liquid primary coating composition to optical fiber 1. Optical fiber 1 is drawn in the direction indicated at a particular draw speed. Optical fiber 1 is drawn through guide die 5 into coating chamber 7, drawn through coating chamber 7 to sizing die 9, and drawn through sizing die 9 to downstream coating application unit 3'. A primary coating liquid is applied to optical fiber 1 in coating chamber 7. Primary coating liquid is supplied to coating chamber 7 at inlet 320 and removed from coating chamber 7 at outlet 322. The primary coating liquid flows in transverse directions 340 and 345 in coating chamber 7. Optical fiber 1 enters coating application unit 3' at guide die 5', is drawn through guide die 5' to coating chamber 7', is drawn through coating chamber 7' to sizing die 9', and drawn through sizing die 9' to downstream processing units (not shown). A secondary coating liquid is applied to optical fiber 1 in coating chamber 7'. Secondary coating liquid is supplied to coating chamber 7' at inlet 320' and removed from coating chamber 7' at outlet 322'. The secondary coating liquid flows in transverse directions 375 and 380 in coating chamber 355. Although transverse flow of coating liquid is depicted as occurring in the same or similar transverse directions in coating chambers 7 and 7', it is understood that transverse flow of coating liquid can occur in different directions in coating chambers 7 and 7'. Further, it should be understood that the primary coating liquid and the secondary coating liquid can be supplied to coating chambers 7 and 7' by two separate systems like system 300 in FIG. 6. Each system can supply the same coating liquid or a different coating liquid.

Figure 11:
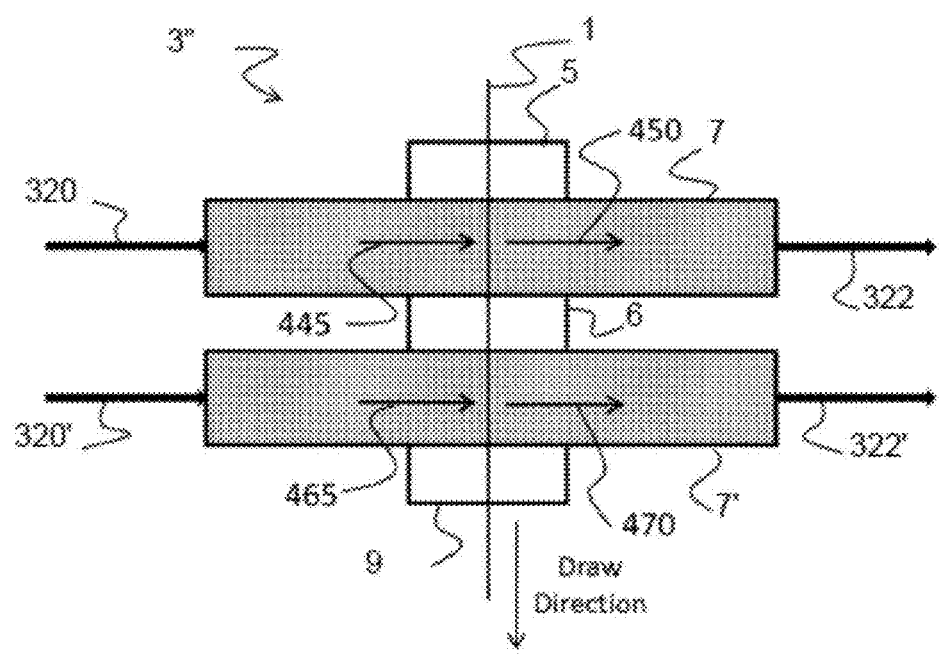

FIG. 11 illustrates another example in which primary and secondary coating liquids can be applied to an optical fiber in a wet-on-wet process. Coating unit 3" is used to apply liquid primary and secondary coating compositions to optical fiber 1. Optical fiber 1 is drawn in the direction indicated at a particular draw speed. Optical fiber 1 is drawn through guide die 5 into coating chamber 7, drawn through coating chamber 7 to hybrid die 6, drawn through hybrid die 6 to coating chamber 7', drawn through coating chamber 7' to sizing die 9, and drawn through sizing die 9 to downstream process units (not shown). Hybrid die 6 acts as a sizing die for optical fiber 1 as it exits coating chamber 7 and a guide die for optical fiber 1 as it enters coating chamber 7'. A primary coating liquid is applied to optical fiber 1 in coating chamber 7. Primary coating liquid is supplied to coating chamber 7 at inlet 320 and removed from coating chamber 7 at outlet 322. The primary coating liquid flows in transverse directions 445 and 450 in coating chamber 7. Optical fiber 1 enters coating chamber 7' through hybrid die at 6. A secondary coating liquid is applied to optical fiber 1 in coating chamber 7'. Secondary coating liquid is supplied to coating chamber 7' at inlet 320' and removed from coating chamber 7' at outlet 322'. The secondary coating liquid flows in transverse directions 465 and 470 in coating chamber 7'. Although transverse flow of coating liquid is depicted as occurring in the same or similar transverse directions in coating chambers 7 and 7', it is understood that transverse flow of coating liquid can occur in different directions in coating chambers 7 and 7'. Further, it should be understood that the primary coating liquid and the secondary coating liquid can be supplied to coating chambers 7 and 7' by two separate systems like system 300 in FIG. 6. Each system can supply the same coating liquid or a different coating liquid.

The guide die is preferably free of coating liquid. Alternatively, or in addition, flooding of the guide die does not occur whatsoever in the methods and systems described herein or at least flooding is significantly reduced. Alternatively, or in addition, coating liquid associated with the transverse flow does not enter the guide die.

Coating liquids can be curable coating liquids. Curable coating liquids include one or more curable components. As used herein, the term "curable" is intended to mean that the component, when exposed to a suitable source of curing energy, includes one or more curable functional groups capable of forming covalent bonds that participate in linking (bonding) the component to itself or to other components to form a polymeric coating material. The cured product obtained by curing a curable coating liquid is a coating. The curing process is induced by any of several forms of energy. Forms of energy include radiation or thermal energy. A radiation-curable component is a component that is induced to undergo a curing reaction when exposed to radiation of a suitable wavelength at a suitable intensity for a sufficient period of time. The radiation curing reaction preferably occurs in the presence of a photoinitiator. A radiation-curable component is optionally also thermally curable. Similarly, a thermally-curable component is a component that is induced to undergo a curing reaction when exposed to thermal energy of sufficient intensity for a sufficient period of time. A thermally curable component is optionally also radiation curable. Curable components include monomers, oligomers, and polymers.

A curable component includes one or more curable functional groups. A curable component with only one curable functional group is a monofunctional curable component. A curable component having two or more curable functional groups is a multifunctional curable component. Multifunctional curable components include two or more functional groups capable of forming covalent bonds during the curing process and can introduce crosslinks into the polymeric network formed during the curing process. Multifunctional curable components are also referred to as "crosslinkers" or "curable crosslinkers". Examples of functional groups that participate in covalent bond formation during the curing process are identified below.

The coating composition includes a single monomer or a combination of monomers. The monomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

The monomer component of the curable coating liquid can include ethylenically unsaturated monomers. The monomers include functional groups that are polymerizable groups and/or groups that facilitate or enable crosslinking. The monomers are monofunctional monomers or polyfunctional monomers. In combinations of two or more monomers, the constituent monomers are monofunctional monomers, polyfunctional monomers, or a combination of monofunctional monomers and polyfunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Monofunctional ethylenically unsaturated monomers for the curable coating liquid include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated (4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—OCH$_2$CH$_2$—), n-propoxylene (—OCH$_2$CH$_2$CH$_2$—), isopropoxylene (—OCH$_2$CH(CH$_3$)—), etc. As used herein, the degree of alkoxylation refers to the number of alkoxylene groups in the monomer. In one embodiment, the alkoxylene groups are bonded consecutively in the monomer.

Representative polyfunctional ethylenically unsaturated monomers for the curable coating liquid include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

The monomer component of the coating liquid can include compounds having the general formula $R^2$—$R^1$—O(CH$_2$CH$_3$CHO)$_q$COCH=CH$_2$, where $R^1$ and $R^2$ are each, independently, aliphatic or aromatic, and q=1 to 10, or $R^1$O(CH$_2$CH$_3$CHO)$_q$COCH=CH$_2$, where $R^1$ is aliphatic or aromatic, and q=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the coating liquid can be a multifunctional (meth)acrylate. As used herein, the term "(meth)acrylate" means acrylate or methacrylate. Multifunctional (meth)acrylates are (meth)acrylates having two or more polymerizable (meth)acrylate moieties per molecule, or three or more polymerizable (meth)acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tri propyleneglycol di(meth)acrylate, propoxylated hexanediol di(meth)acrylate, tetrapropyleneglycol di(meth)acrylate, pentapropyleneglycol di(meth)acrylate.

The monomer component of the coating liquid can be an N-vinyl amide such as an N-vinyl lactam, or N-vinyl pyrrolidinone, or N-vinyl caprolactam.

The curable coating liquid optionally includes one or more oligomers. One class of optional oligomers is ethylenically unsaturated oligomers. Suitable optional oligomers include monofunctional oligomers, polyfunctional oligomers, or a combination of a monofunctional oligomer and a polyfunctional oligomer. In some embodiments, the optional oligomer includes aliphatic and aromatic urethane (meth) acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth) acrylate oligomers or combinations thereof. The curable coating liquid may be free of urethane groups, groups that react to form urethane groups, urethane acrylate compounds, urethane oligomers, or urethane acrylate oligomers.

The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiating additives and/or phosphine oxide additives. When used in the photoformation of the coating of the present disclosure, the photoinitiator is present in an amount sufficient to enable rapid radiation curing. The wavelength of curing radiation is infrared, visible, or ultraviolet.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); (2,4,6-triiethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to monomer(s), oligomer(s) and/or oligomeric material(s), and polymerization initiator(s), the coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent.

The methods described herein also include curing the coating liquid on the optical fiber. In one embodiment, the curable coating liquid is cured with an LED or laser source. In one embodiment, the LED source is a UVLED source. The peak wavelength of the LED or laser source is a wavelength less than 410 nm, or less than 405 nm, or less than 400 nm, or less than 395 nm, or in the range from 340 nm-410 nm, or in the range from 350 nm-405 nm, or in the range from 360 nm-405 nm, or in the range from 365 nm-400 nm, or in the range from 370 nm-395 nm, or in the range from 375 nm-390 nm, or in the range from 375 nm-400 nm, or in the range from 380 nm-400 nm.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—OCH$_2$CH$_2$—), n-propoxylene (—OCH$_2$CH$_2$CH$_2$—), isopropoxylene (—OCH$_2$CH(CH$_3$)—), etc. As used herein, the degree of alkoxylation refers to the number of alkoxylene groups in the monomer. The alkoxylene groups can be bonded consecutively in the monomer.

The secondary coating, when used, can use be the same or different components as the primary coating.

The disclosure also includes various systems comprising: a process pathway through a coating chamber, the coating chamber comprising an inlet and an outlet, and a coating liquid to coat the optical fiber; a means for pumping the coating liquid through the inlet into the coating chamber, the coating liquid exiting the coating chamber through the outlet; and a means for recirculating the coating liquid exiting the coating chamber to the inlet.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

What is claimed is:

1. A method of processing an optical fiber, comprising the steps of:
drawing an optical fiber in a drawing direction along a process pathway through a coating chamber, the coating chamber comprising:
an inlet and an outlet, and
a coating liquid to coat the optical fiber;
supplying the coating liquid through the inlet into the coating chamber, the supplying comprising delivering the coating liquid to the coating chamber at a flow rate and a first pressure, the coating liquid exiting the coating chamber through the outlet; and recirculating the coating liquid exiting the coating chamber to the inlet, the recirculating comprising reducing the pressure of the coating liquid from the first pressure to a second pressure; and independently controlling the flow rate and first pressure, the independent controlling comprising one of (a) varying the flow rate without varying the first pressure or (b) varying the first pressure without varying the flow rate.

2. The method of claim 1, wherein the supplying comprises varying the coating liquid between a maximum pressure and a minimum pressure, the minimum pressure being greater than a pressure of the coating liquid in the coating chamber.

3. The method of claim 1, wherein a temperature of the coating liquid at the inlet is less than a temperature of the coating liquid at the outlet.

4. The method of claim 1, wherein the optical fiber enters the coating chamber through a guide die and wherein the guide die comprises a bell section, a taper section, and a land section, or wherein the guide die comprises a cone-only guide die, the cone-only guide die comprising a cone section and a land section, the cone-only guide die lacking a bell section.

5. The method of claim 4, wherein the optical fiber is drawn through the coating chamber to a sizing die and wherein the sizing die comprises a cone-only sizing die, the cone-only sizing die comprising a cone section and a land section, the cone-only sizing die lacking a bell section.

6. The method of claim 5, wherein the coating liquid is directed in a transverse direction through a channel positioned in the coating chamber between the guide die and the sizing die.

7. The method of claim 5, wherein the outlet is spaced apart from the guide die and the sizing die.

8. The method of claim 1, wherein an approximately equal amount of the coating liquid exits through the outlet as enters through the inlet.

9. The method of claim 1, wherein the coating liquid supplied through the inlet is directed against a gyre comprising the coating liquid contained in the coating chamber, the gyre being formed in the coating chamber adjacent to the optical fiber.

10. The method of claim 9, wherein a difference between a maximum temperature of the coating liquid in the gyre and a minimum temperature of the coating liquid in the gyre is less than 80° C.

11. The method of claim 1, wherein the recirculating comprises:

delivering the coating liquid exiting the coating chamber to a pressurized catch can, the pressurized catch can containing the coating liquid at the second pressure;

pumping the coating liquid from the pressurized catch can to a pressurized keg, the pressurized keg containing the coating liquid at the first pressure;

and delivering the coating liquid from the pressurized keg to the inlet.

12. The method of claim 1, wherein the delivering the coating liquid comprises removing the coating liquid from a keg pressurized to the first pressure and the recirculating comprises directing the coating liquid exiting the coating chamber to the keg.

13. The method of claim 12, wherein the recirculating comprises directing the coating liquid exiting the coating chamber to a catch can pressurized to the second pressure and the directing the coating liquid to the keg comprises directing the coating liquid from the catch can to the keg.

14. The method of claim 1, wherein the independently controlling further comprises varying the second pressure.

15. The method of claim 1, wherein the independently controlling comprises (a) varying the flow rate without varying the first pressure.

16. The method of claim 15, wherein the varying the flow rate comprises increasing the flow rate and the independently controlling further comprises reducing the second pressure.

17. The method of claim 1, wherein the independently controlling comprises (b) varying the first pressure without varying the flow rate.

18. The method of claim 17, wherein the varying the first pressure comprises increasing the first pressure and the independently controlling further comprises increasing the second pressure.

19. The method of claim 1, wherein the second pressure is a pressure greater than atmospheric pressure.

* * * * *